US009817852B2

(12) United States Patent
Um et al.

(10) Patent No.: US 9,817,852 B2
(45) Date of Patent: Nov. 14, 2017

(54) ELECTRONIC SYSTEM WITH VERSION CONTROL MECHANISM AND METHOD OF OPERATION THEREOF

(71) Applicant: Samsung Electronics Co., Ltd., Suwon-si, Gyeonggi-Do (KR)

(72) Inventors: Taeil Um, San Jose, CA (US); Sushma Devendrappa, San Jose, CA (US); Jignesh Patel, Madison, WI (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/838,932

(22) Filed: Aug. 28, 2015

(65) Prior Publication Data

US 2016/0062914 A1    Mar. 3, 2016

Related U.S. Application Data

(60) Provisional application No. 62/043,105, filed on Aug. 28, 2014.

(51) Int. Cl.
| | |
|---|---|
| *G06F 12/00* | (2006.01) |
| *G06F 17/30* | (2006.01) |
| *G06F 12/06* | (2006.01) |
| *G06F 12/12* | (2016.01) |

(52) U.S. Cl.
CPC .. *G06F 17/30309* (2013.01); *G06F 17/30008* (2013.01); *G06F 17/3023* (2013.01); *G06F 17/30548* (2013.01); *G06F 17/30551* (2013.01); *G06F 12/0638* (2013.01); *G06F 12/12* (2013.01)

(58) Field of Classification Search
CPC .......... G06F 17/30008; G06F 17/3023; G06F 17/30309; G06F 17/30548; G06F 17/30551
USPC ......................................................... 711/104
See application file for complete search history.

(56) References Cited

U.S. PATENT DOCUMENTS

| | | | |
|---|---|---|---|
| 8,140,495 B2 | 3/2012 | Carlin et al. | |
| 2005/0171960 A1* | 8/2005 | Lomet | ............... G06F 17/30327 |
| 2008/0086470 A1* | 4/2008 | Graefe | ............... G06F 17/30362 |
| 2010/0042597 A1* | 2/2010 | Shinjo | ............... G06F 17/30985 |
| | | | 707/769 |
| 2011/0040478 A1* | 2/2011 | Rinscheid | .......... G01C 21/3688 |
| | | | 701/532 |
| 2013/0054869 A1* | 2/2013 | Tolia | ................... G06F 12/0871 |
| | | | 711/102 |
| 2013/0110883 A1 | 5/2013 | Junqueira et al. | |
| 2013/0262423 A1 | 10/2013 | Graefe et al. | |
| 2014/0229429 A1* | 8/2014 | Bestgen | ............ G06F 17/30289 |
| | | | 707/609 |
| 2014/0297776 A1* | 10/2014 | Volvovski | ........... H04L 67/1097 |
| | | | 709/212 |
| 2014/0358934 A1* | 12/2014 | Hirose | ............. G06F 17/30445 |
| | | | 707/741 |

\* cited by examiner

*Primary Examiner* — Mardochee Chery
(74) *Attorney, Agent, or Firm* — IP Investment Law Group

(57) ABSTRACT

An electronic system includes: a storage device configured to store a descriptor, including a key and a value, having multiple versions linked on the storage device; a storage interface, coupled to the storage device, configured to provide an entry having a location; and retrieve the descriptor, including the key and the value, based on the entry having the location for selecting one of the versions of the descriptor.

20 Claims, 12 Drawing Sheets

ELECTRONIC SYSTEM WITH VERSION CONTROL MECHANISM AND METHOD OF OPERATION THEREOF

CROSS-REFERENCE TO RELATED APPLICATION(S)

This application claims the benefit of U.S. Provisional Patent Application Ser. No. 62/043,105 filed Aug. 28, 2014, and the subject matter thereof is incorporated herein by reference thereto.

TECHNICAL FIELD

An embodiment of the present invention relates generally to an electronic system, and more particularly to a system for version control.

BACKGROUND

Electronic information storage and retrieval serves many consumer and industrial systems. Access to electronic information can be critical to many systems such as modern consumer and industrial electronics, including devices such as cellular phones, portable digital assistants, graphical display systems, televisions, projectors, and combination devices. The electronic information storage and retrieval provides increasing levels of functionality to support modern life. Research and development in the existing technologies can take a myriad of different directions.

Access to the electronic information for storage and retrieval can involve protecting portions of the electronic information when more than one systems attempts access. The protection of the portions of the electronic information prevents inconsistencies or errors with the electronic information storage and retrieval. The protection process can significantly impact performance of the access to the electronic information at least due to delays in waiting until a previous process or access is complete.

Thus, a need still remains for an electronic system with version control mechanism for access to electronic information. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a storage device configured to store a descriptor, including a key and a value, having multiple versions linked on the storage device; a storage interface, coupled to the storage device, configured to provide an entry including a location; and retrieving the descriptor, including the key and the value, based on the entry including the location for concurrent accesses to the storage device.

An embodiment of the present invention provides a method of operation of an electronic system including: storing a descriptor on a storage device with the descriptor, including a key and a value, having multiple versions linked on the storage device; providing an entry, including a location, with a storage interface, coupled to the storage device; and retrieving the descriptor, including the key and the value, with the storage interface, coupled to the storage device, based on the entry including the location for selecting one of the versions of the descriptor.

An embodiment of the present invention provides a non-transitory computer readable medium including stored thereon instructions to be executed by a control unit including: storing a descriptor, including a key and a value, on a storage device with the descriptor having multiple versions linked on the storage device; providing an entry, including a location, on a memory device, coupled to the storage device; and retrieving the descriptor, including the key and the value, with the storage interface, coupled to the storage device, based on the entry including the location for selecting one of the versions of the descriptor.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
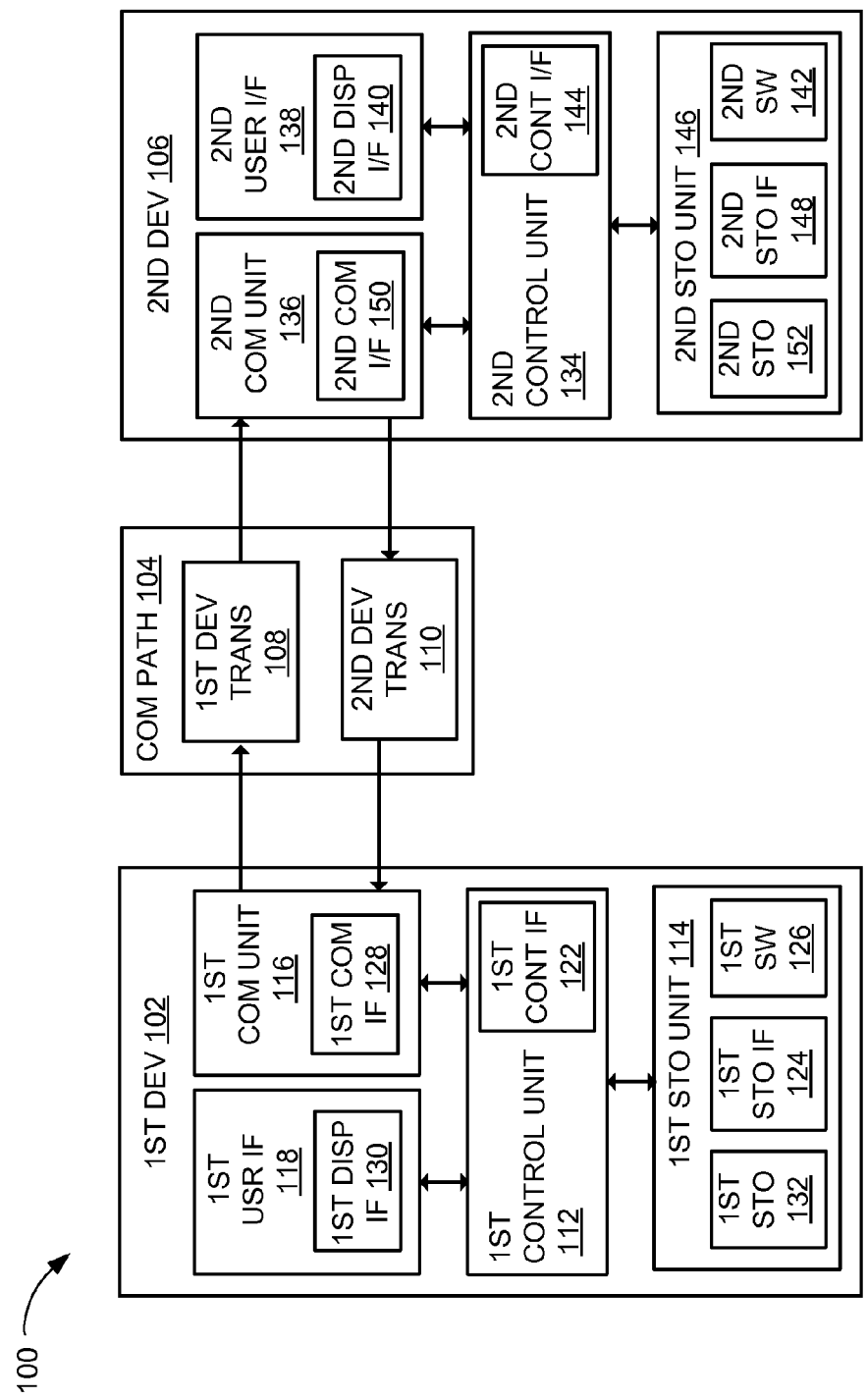
FIG. 1 is a block diagram of an electronic system with a version control mechanism in an embodiment of the invention.

An embodiment of the present invention provides Multi-Version Concurrency Control (MVCC) processes for electronic systems such as database management systems. The MVCC process can provide concurrent access to the electronic system without locking electronic information, such as a database, preventing inconsistencies in datasets, avoiding increased latency, improving performance, or combination thereof. The MVCC process can avoid locking operations including a need for newer operations to wait until previous operations are complete. Such locking operations impact performance, increase latency, or combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, application software, or a combination thereof. The software can also include a function, a call to a function, a code block, or a combination thereof.

Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof. Further, if a module is written in the apparatus claims section below, the modules are deemed to include hardware circuitry for the purposes and the scope of apparatus claims.

Referring now to FIG. 1, therein is shown an example of a block diagram of an electronic system 100 with a version control mechanism in an embodiment of the invention. The electronic system 100 can include a first device 102, such as system including a client or a server, connected to a second device 106, such as a system including a client or a server. The first device 102 can communicate with the second device 106 with a communication path 104, such as a wireless network, a wired network, physical interfaces such as ATA, SATA, SAS, PCIe, any network, any physical interface, or combination thereof.

The first device 102 can include a first control unit 112, a first storage unit 114, a first communication unit 116, and a first user interface 118. The first control unit 112 can include a first control interface 122. The first control unit 112 can execute a first software 126 of the electronic system 100. The first storage unit 114 can be a volatile memory, a nonvolatile memory, an internal memory, an external memory, or a combination thereof. For example, the first storage unit 114 can be a nonvolatile storage such as non-volatile random access memory (NVRAM), solid-state storage device (SSD) including Flash memory, disk storage, or a volatile storage such as static random access memory (SRAM).

The second device 106 can be optimized for implementing an embodiment of the present invention in a multiple device embodiment with the first device 102. The second device 106 can provide the additional or higher performance processing power compared to the first device 102. The second device 106 can include a second control unit 134, a second communication unit 136, and a second user interface 138. The second storage unit 146 can include a second storage interface 148. The second storage interface 148 can be used for communication between other functional units in the second device 106. The second storage interface 148 can also be used for communication that is external to the second device 106.

The electronic system 100 can include the first device 102, the communication path 104, and the second device 106. The first device 102 can send information in a first device transmission 108 over the communication path 104 to the second device 106. The second device 106 can send information in a second device transmission 110 over the communication path 104 to the first device 102.

The first control unit 112 can be implemented in a number of different manners. For example, the first control unit 112 can be a processor, an application specific integrated circuit (ASIC) an embedded processor, a microprocessor, a hardware control logic, a hardware finite state machine (FSM), a digital signal processor (DSP), or a combination thereof. The first control interface 122 can be used for communication between the first control unit 112 and other functional units in the first device 102. The first control interface 122 can also be used for communication that is external to the first device 102.

The first control interface 122 can receive information from the other functional units or from external sources, or can transmit information to the other functional units or to external destinations. The external sources and the external destinations refer to sources and destinations external to the first device 102. The first control interface 122 can be implemented in different ways and can include different implementations depending on which functional units or external units are being interfaced with the first control interface 122.

The first storage unit 114, the second storage unit 146, or combination thereof, can include a memory component, a client memory, a server memory, flash memory, or combination thereof.

The first storage unit 114 can store the first software 126. The first storage unit 114 can also store the relevant information, such as data representing images, sound files, text, data, or a combination thereof.

The first storage unit 114 can be a volatile memory, a nonvolatile memory, an internal memory, an external memory, or a combination thereof. For example, the first storage unit 114 can be a nonvolatile storage such as non-volatile random access memory (NVRAM), solid-state storage device (SSD) including Flash memory, disk storage, or a volatile storage such as static random access memory (SRAM).

The first storage unit 114 can include a first storage interface 124. The first storage interface 124 can be used for communication between and other functional units in the first device 102. The first storage interface 124 can also be used for communication that is external to the first device 102.

The first storage interface 124 can receive information from the other functional units or from external sources, or can transmit information to the other functional units or to external destinations. The external sources and the external destinations refer to sources and destinations external to the first device 102.

The first storage interface 124 can include different implementations depending on which functional units or external units are being interfaced with the first storage unit 114. The first storage interface 124 can be implemented with technologies and techniques similar to the implementation of the first control interface 122.

The first communication unit 116 can enable external communication to and from the first device 102. For example, the first communication unit 116 can permit the first device 102 to communicate with the second device 106, an attachment, such as a peripheral device or a computer desktop, and the communication path 104.

The first communication unit 116 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication unit 116 can include a first communication interface 128. The first communication interface 128 can be used for communication between the first communication unit 116 and other functional units in the first device 102. The first communication interface 128 can receive information from the other functional units or can transmit information to the other functional units.

The first communication interface 128 can include different implementations depending on which functional units are being interfaced with the first communication unit 116. The first communication interface 128 can be implemented with technologies and techniques similar to the implementation of the first control interface 122.

The first user interface 118 allows a user (not shown) to interface and interact with the first device 102. The first user interface 118 can include an input device and an output device. Examples of the input device of the first user interface 118 can include a keypad, a mouse, a touchpad, soft-keys, a keyboard, a microphone, an infrared sensor for receiving remote signals, or any combination thereof to provide data and communication inputs.

The first user interface 118 can include a first display interface 130. The first display interface 130 can include a display, a projector, a video screen, a speaker, or any combination thereof. The display, a projector, a video screen, a speaker, or any combination thereof, can display data stored on a first storage device 132.

The first control unit 112 can operate the first user interface 118 to display information generated by the electronic system 100. The first control unit 112 can also execute the first software 126 for the other functions of the electronic system 100. The first control unit 112 can further execute the first software 126 for interaction with the communication path 104 via the first communication unit 116.

The second device 106 can be optimized for implementing an embodiment of the present invention in a multiple device embodiment with the first device 102. The second device 106 can provide the additional or higher performance processing power compared to the first device 102. The second device 106 can include a second control unit 134, a second communication unit 136, and a second user interface 138.

The second user interface 138 allows a user (not shown) to interface and interact with the second device 106. The second user interface 138 can include an input device and an output device. Examples of the input device of the second user interface 138 can include a keypad, a touchpad, soft-keys, a keyboard, a mouse, a microphone, or any combination thereof to provide data and communication inputs. Examples of the output device of the second user interface 138 can include a second display interface 140. The second display interface 140 can include a display, a projector, a video screen, a speaker, or any combination thereof.

The second control unit 134 can execute a second software 142 to provide the intelligence of the second device 106 of the electronic system 100. The second software 142 can operate in conjunction with the first software 126. The second control unit 134 can provide additional performance compared to the first control unit 112.

The second control unit 134 can operate the second user interface 138 to display information. The second control unit 134 can also execute the second software 142 for the other functions of the electronic system 100, including operating the second communication unit 136 to communicate with the first device 102 over the communication path 104.

The second control unit 134 can be implemented in a number of different manners. For example, the second control unit 134 can be a processor, an embedded processor, a microprocessor, hardware control logic, a hardware finite state machine (FSM), a digital signal processor (DSP), or a combination thereof.

The second control unit 134 can include a second control interface 144. The second control interface 144 can be used for communication between the second control unit 134 and other functional units in the second device 106. The second control interface 144 can also be used for communication that is external to the second device 106.

The second control interface 144 can receive information from the other functional units or from external sources, or can transmit information to the other functional units or to external destinations. The external sources and the external destinations refer to sources and destinations external to the second device 106. The second control interface 144 can be implemented in different ways and can include different implementations depending on which functional units or external units are being interfaced with the second control interface 144.

A second storage unit 146 can store the second software 142. The second storage unit 146 can also store the relevant information such as data representing incoming images, sound files, text, data, or a combination thereof. The second storage unit 146 can be sized to provide the additional storage capacity to supplement the first storage unit 114.

For illustrative purposes, the second storage unit 146 is shown as a single element, although it is understood that the second storage unit 146 can be a set of storage elements such as a storage array. Also for illustrative purposes, the electronic system 100 is shown with the second storage unit 146 as a single hierarchy storage system, although it is understood that the electronic system 100 can have the second storage unit 146 in a different configuration.

For example, the second storage unit 146 can be formed with different storage technologies forming a memory hierarchal system including different levels of caching, main memory, rotating media, or off-line storage. The second storage unit 146 can be a volatile memory, a nonvolatile memory, an internal memory, an external memory, or a combination thereof. For example, the second storage unit 146 can be a nonvolatile storage such as non-volatile random access memory (NVRAM), solid-state storage device (SSD) including Flash memory, disk storage, or a volatile storage such as static random access memory (SRAM).

The second storage unit 146 can include a second storage interface 148. The second storage interface 148 can be used for communication between other functional units in the second device 106. The second storage interface 148 can also be used for communication that is external to the second device 106.

The second storage interface 148 can receive information from the other functional units or from external sources, or can transmit information to the other functional units or to external destinations. The external sources and the external destinations refer to sources and destinations external to the second device 106.

The second storage interface 148 can include different implementations depending on which functional units or external units are being interfaced with the second storage unit 146. The second storage interface 148 can be implemented with technologies and techniques similar to the implementation of the second control interface 144.

The second communication unit 136 can enable external communication to and from the second device 106. For example, the second communication unit 136 can permit the second device 106 to communicate with the first device 102 over the communication path 104.

The second communication unit 136 can also function as a communication hub allowing the second device 106 to function as part of the communication path 104 and not limited to be an end point or terminal unit to the communication path 104. The second communication unit 136 can include active and passive components, such as microelectronics or an antenna, for interaction with the communication path 104.

The second communication unit 136 can include a second communication interface 150. The second communication interface 150 can be used for communication between the second communication unit 136 and other functional units in the second device 106. The second communication interface 150 can receive information from the other functional units or can transmit information to the other functional units.

The second communication interface 150 can include different implementations depending on which functional units are being interfaced with the second communication unit 136. The second communication interface 150 can be implemented with technologies and techniques similar to the implementation of the second control interface 144.

The first communication unit 116 can couple with the communication path 104 to send information to the second device 106 in the first device transmission 108. The second device 106 can receive information in the second communication unit 136 from the first device transmission 108 of the communication path 104.

The second communication unit 136 can couple with the communication path 104 to send information to the first device 102 in the second device transmission 110. The first device 102 can receive information in the first communication unit 116 from the second device transmission 110 of the communication path 104. The electronic system 100 can be executed by the first control unit 112, the second control unit 134, or a combination thereof. For illustrative purposes, the second device 106 is shown with the partition having the second user interface 138, the second storage unit 146, the second control unit 134, and the second communication unit 136, although it is understood that the second device 106 can have a different partition. For example, the second software 142 can be partitioned differently such that some or all of its function can be in the second control unit 134 and the second communication unit 136. Also, the second device 106 can include other functional units not shown in FIG. 1 for clarity.

For illustrative purposes, the first storage unit 114, the second storage unit 146, or combination thereof, are shown with the first storage device 132 and the second storage device 152, although it is understood that the first storage unit 114, the second storage unit 146 or combination thereof, can include any number or type of memory or storage devices. The first storage device 132 and the second storage device 152 can include one or more of a drive, a solid state drive (SSD), a solid state device, a non-volatile storage device, any storage device, or combination thereof.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100.

The modules, processes, functions, applications, or combination thereof, described in this application can be implemented as instructions stored on a non-transitory computer readable medium to be executed by a first control unit 112, the second control unit 134, or a combination thereof. The non-transitory computer medium can include the first storage unit 114, the second storage unit 146, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

Modules, processes, functions, applications, or combination thereof, in this application can be hardware implementation, hardware circuitry, or hardware accelerators in the first control unit 112 or in the second control unit 134. The modules can also be hardware implementation, hardware circuitry, or hardware accelerators within the first device 102 or within the second device 106 but outside of the first control unit 112 or the second control unit 134, respectively.

Modules, processes, functions, applications, or combination thereof, in this application can be at least a part of the first software 126, the second software 142, or a combination thereof. These modules can also be stored in the first storage unit 114, in the second storage unit 146, or a combination thereof. The first control unit 112, the second control unit 134, or a combination thereof can execute these modules for operating the electronic system 100.

Figure 2:
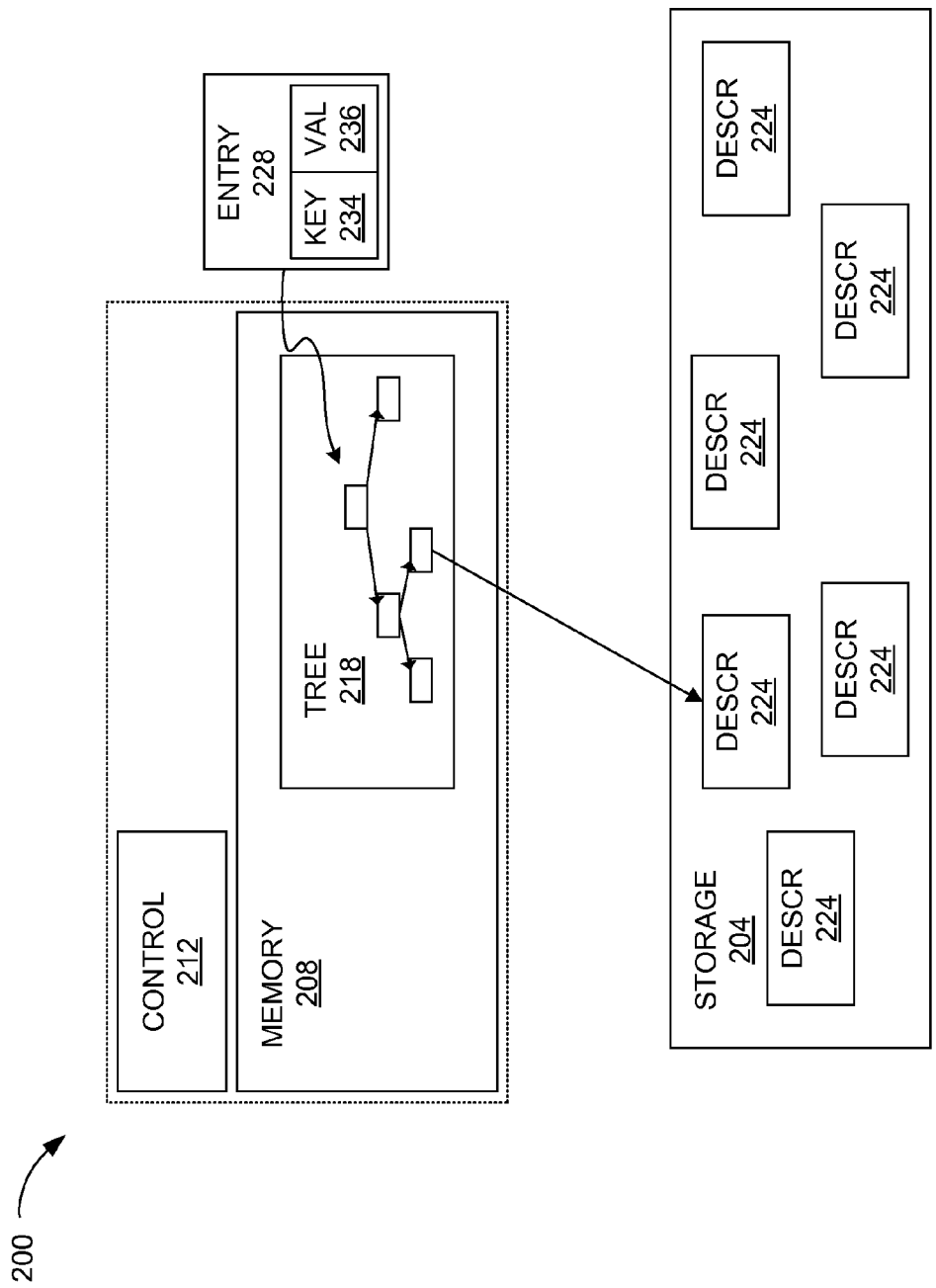
FIG. 2 is a block diagram of an electronic system with a version control in an embodiment of the invention.

Referring now to FIG. 2, therein is shown a block diagram of an electronic system 200 with a version control in an embodiment of the invention. The electronic system 200, in a manner similar to the electronic system 100, can provide multi-version concurrency control (MVCC) and snapshot isolation (SI) with storage, such as a solid-state storage device (SSD) including flash storage, the first storage unit 114 of FIG. 1, the second storage unit 146 of FIG. 1, or combination thereof, and memory, such as system memory, the first storage unit 114, the second storage unit 146, or combination thereof. The storage can include device level key value store for storage such as solid state storage drives (SSD) including a Smart SSD. The device level key value store can include multi-version concurrency control and snapshot isolation support on storage, such as SSD.

In an embodiment, a key value store can provide Multi-Version Concurrency Control (MVCC) with snapshot isolation (SI), including chaining or linking versions of a key value pair on media. The electronic system 200 can provide device firmware support for the MVCC in the key value store, for example on solid-state storage devices (SSD) including flash memory. The electronic system 200 can include the MVCC support on the key value store with multiple versions of a same key having at least one latest version. Versions of the key can be chained together on media such that the versions can be stored under the same key space with physical space occupying versioning.

In an embodiment, a Multi-Version Concurrency Control (MVCC) can mark older data as obsolete and write newer data in a different location, thus avoiding overwriting of the older data. The MVCC can provide multiple versions of a same dataset, such as a key value pair in a key value store. The multiple versions of the same dataset can coexist in the electronic system 200. The MVCC can further provide access to a snapshot of data at a start of an operation without modification or deletions by another operation.

In an embodiment, multiple readers can read a consistent value of a given key concurrently with a writer writing a new version of the key in a different location. One or more of the readers can operate concurrently with one of the writer for the given key. A Multi-Version Concurrency Control (MVCC) does not block an operation, though a write operation can fail if a writer writes with an obsolete transaction identification, since another of the write operation might have changed the given key. The MVCC provides significantly improved performance.

In an embodiment, a Multi-Version Concurrency Control (MVCC) can provide each operation visibility to a snapshot of a database at a predetermined time, such as a chosen time or an assigned time, thus avoiding locking operations. The MVCC can provide a point in time consistent view of the database or dataset, such as the snapshot. A read transaction or operation can include a timestamp or a transaction identification (ID) for determining a state of the database at a time of the read transaction. Changes to the database after the snapshot can be unavailable for viewing, particularly for changes that have not been fully committed. The changes, such as future writes, can include a later of the timestamp or a later of the transaction identification, unavailable for viewing.

In an embodiment snapshot isolation can provide all readers a snapshot of a dataset such as a consistent snapshot taken when a read starts. Updates to the dataset, subsequent to the snapshot of the dataset taken when a read starts, succeed based on avoiding conflicts with other updates including concurrent updates. The snapshot isolation can provide significantly improved performance with eliminating serial access and providing concurrency control. The snapshot isolation can preferably be implemented with Multi-Version Concurrency Control (MVCC).

In an embodiment, a device level key value store can include a flash optimized key value store. The device level key value store can complement databases such as next generation databases, non-relational databases, distributed databases, open-source databases, horizontally scalable databases, web-scale databases, NoSQL (sometimes referred to as "not only sql") databases, or combination thereof, with device-level functionality. The device level key value store can provide support for MVCC with snapshot isolation including operations such as get/put/update/delete by a single input output (I/O) operation. The device level key value store can also support MVCC operations with snapshot isolation by a single I/O access.

In an embodiment, Multi-Version Concurrency Control (MVCC) and snapshot isolation (SI) support can be optimized on a flash memory based key value store. The MVCC and SI on the key value store can be implemented with functionality support on an application level, in firmware, flash based, or combination thereof. The functionality support can include implementation of transaction primitives in device associated software, hardware, or combination thereof, eliminating or reducing needs for metadata at an application level, thus saving or minimizing use of system memory such as system DRAM.

In an embodiment, this functionality support can provide reduced input and output processes (IOs) with underlying storage device by linking all versions of a key value pair when writing a new version of the key value pair, reducing metadata stored on memory, for example random access memory (RAM), tracking all versions of a key value pair, or combination thereof. This support can further include implementing special functionalities with flash device firmware, linking all versions of key value pairs on a flash device thus providing one input and output process (IO) for one or more key value operation.

In an embodiment, the electronic system 200 including device level key value store, Multi-Version Concurrency Control (MVCC), snapshot isolation (SI), or combination thereof, can optimize MVCC features, SI features, or combination thereof. In particular, the electronic system 200 can provide optimization of MVCC features, SI features, or combination thereof, for databases such as next generation databases, non-relational databases, distributed databases, open-source databases, horizontally scalable databases, web-scale databases, NoSQL databases, or combination thereof.

In an embodiment, this optimization can include changing functionality of an underlying storage system including chaining versions of the key value pair on an actual storage device. The MVCC features, SI features, or combination thereof, can be optimized for databases designed for flash storage devices, and can include a linked list, firmware interface changes, or combination thereof. The linked list can include some or all versions of a key value pair maintained on flash storage. The firmware interface changes can include writing a new version of a key value pair on flash storage such that a linked list is formed, including as an example a latest version at a head or beginning of the linked list and an oldest version at a tail or end of a list. Further, only one input and output (IO) operation can be required for writing a new version on or in a storage medium, such as a flash memory.

In an embodiment, the electronic system 200 can include storage devices, such as a storage device 204, a memory device 208, the first storage unit 114, the second storage unit 146, or combination thereof. For example, the storage device 204, the memory device 208, or combination thereof, can be implemented in first storage device 132, the second storage device 152, the first storage unit 114, the second storage unit 146, or combination thereof.

In an embodiment, a control device 212, such as the first control unit 112 of FIG. 1, the second control unit 134 of FIG. 1, or combination thereof, can be coupled to the memory device 208, the storage device 204, other disclosed devices, any device, or combination thereof. For example, the control device 212 and the memory 208 can be included in the first device 102 of FIG. 1 depicted by the block having a dotted line.

In an embodiment, the memory device 208, such as system memory, random access memory (RAM), a volatile memory device, any memory device, or combination thereof, can include a tree 218. The storage device 204, such as a drive, a solid state drive (SSD), a solid state device, a non-volatile storage device, any storage device, or combination thereof, can include a descriptor 224 such as key value index node (KVInode) data. For illustrative purposes, six (6) of the descriptors 224 are shown, although it is understood that any number of the descriptors 224 may be included and that the values or content of each of the descriptors 224 may be different.

In an embodiment, the tree 218, such as a binary tree, hash tree, similar data structure, or combination thereof, can be implemented in the memory device 208. The tree 218 can index mapping information and entries 228 of the tree 218 with keys 234, value 236 such as KVInode Numbers, hash values, or combination thereof. A key 234 of an entry 228 can be included or inserted in the tree 218 and remain in the tree 218 until an application removes or deletes the key 234. The tree 218 can include or consist of binary tree keys associated or pointing to locations of associated values.

For example, the tree 218 can include an entry 228, for example a sixty-four bit (64-bit) hash, for each key 234. The entry 228 including the value 236 can include a location of the descriptor 224, such as the KVInode location. The location can be represented by a 64-bit address with logical block addressing (LBA) for a descriptor 224, such as a KVInode, in the storage device 204. For a given key 228, an associated and unique descriptor 224, such as a unique KVInode, can be found or associated with the address in the storage device 204. For illustrative purposes, five (5) of the entries 228 are shown, although it is understood that any number of the entries 228 may be included and that the values or content of each of the entries 228 may be different.

It has been discovered that the electronic system 200 including the storage 204 with the descriptor 224 and the memory 208 with the tree 218 can require only one input and output (IO) operation for writing a new version of the descriptor 224 on or in a storage medium. The descriptor 224 can include a linked list accessed with the tree 218 for operations by a single input and output (I/O) access.

Figure 3:
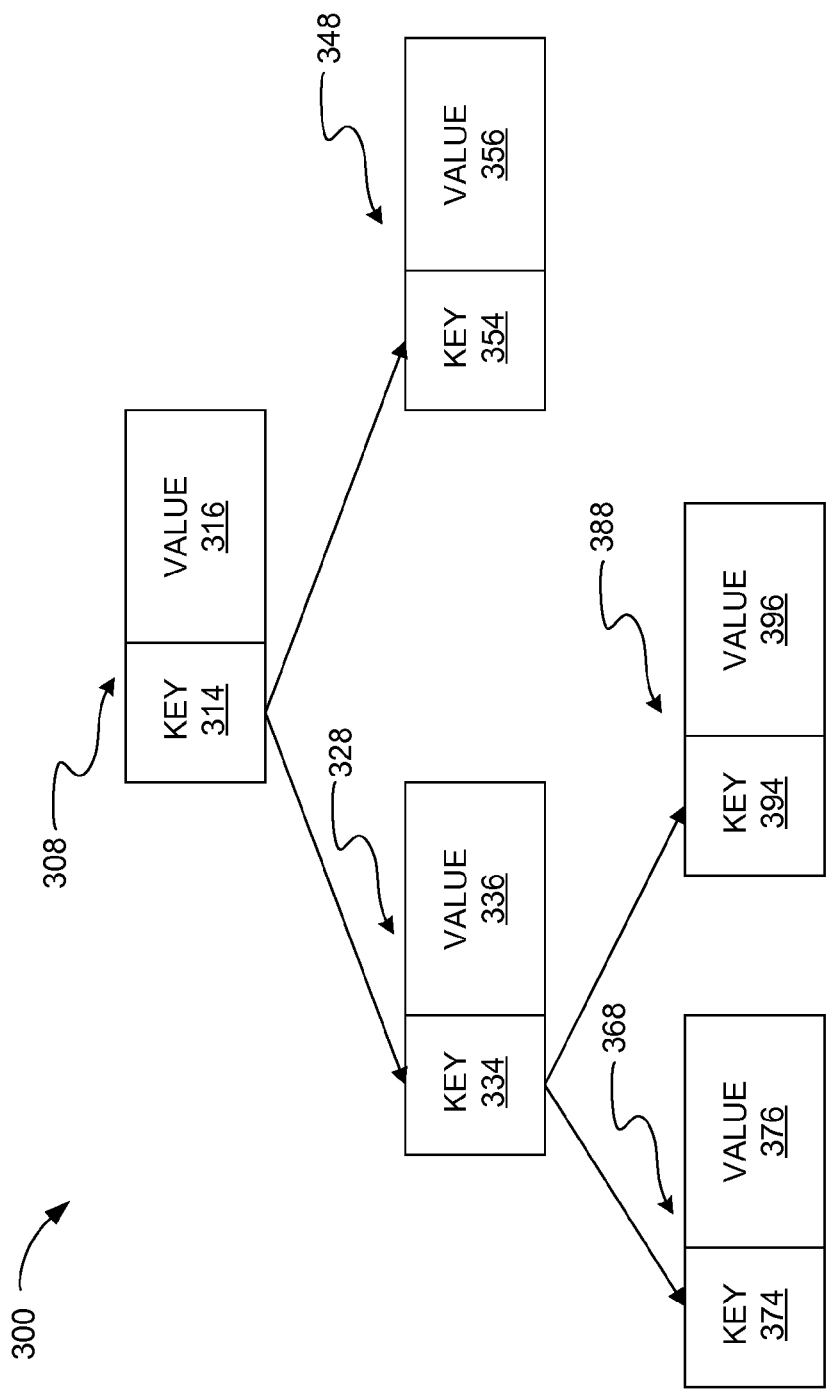
FIG. 3 is a memory structure of the electronic system in an embodiment of the invention.

Referring now to FIG. 3, therein is shown a memory structure 300 of the electronic system 100 in an embodiment of the invention. The memory structure 300 such as an index, a binary tree, mapping information, a hash tree, or combination thereof, can be implemented in a storage system such as the electronic system 200 of FIG. 2 in a manner similar to the tree 218 of FIG. 2. The storage system can include a memory device such as the memory device 208 of FIG. 2, the storage unit 114 of FIG. 1, the storage unit 146 of FIG. 1, a volatile memory device, a non-volatile memory device, or combination thereof.

In an embodiment, the memory structure 300 can include locations for saved descriptors, such as key value index node (KVInode) data, in a non-volatile memory device. The memory structure 300 can include a simple number representing a start block address for locating the saved descriptor for each key value pair that was stored in the non-volatile memory device.

In an embodiment, the memory structure 300 can include a first entry 308. The first entry 308, such as mapping information, can include a first key 314, a first value 316, or combination thereof. The first value 316 can include a key value index node (KVInode) number, an address, a location, or combination thereof, for a first descriptor such as key value index node (KVInode) data, the descriptor 224 of FIG. 2, or combination thereof. The first key 314 can include a reference, a key, version of a key, or combination thereof, of the first descriptor such as the descriptor 224.

For example, the first value 316 can include a location for the first descriptor, such as the descriptor 224, with a simple number representing a start block address of logical block addressing (LBA) for a storage device such as the storage device 204 of FIG. 2, the storage unit 114, the storage unit 146, any storage device, a non-volatile storage device, or combination thereof. The first value 316 can be used for locating the first descriptor for each key value pair, including a KVInode, the descriptor 224, or combination thereof, which was stored in the non-volatile memory device. For example, the first value 316 can represent a start block address for a saved KVInode descriptor in the non-volatile memory device.

In an embodiment, the memory structure 300 can include a second entry 328 with a second key 334, a second value 336, or combination thereof. The second value 336 can include a key value index node (KVInode) number, an address, a location, or combination thereof, for a second descriptor such as key value index node (KVInode) data, the descriptor 224, or combination thereof. The second key 334 can include a reference, a key, version of a key, or combination thereof, of the second descriptor such as the descriptor 224. For example, in a manner similar to the first entry 308, the second value 336 can include a location for the second descriptor with at least a simple number representing a start block address for locating the saved descriptor for each key value pair that was stored in the non-volatile memory device.

In an embodiment, the memory structure 300 can include a third entry 348 with a third key 354, a third value 356, or combination thereof. The third value 356 can include a key value index node (KVInode) Number, an address, a location, or combination thereof, for a third descriptor such as key value index node (KVInode) data, the descriptor 224, or combination thereof. The third key 354 can include a reference, a key, version of a key, or combination thereof, of the third descriptor such as the descriptor 224. For example, in a manner similar to the first entry 308, the third value 356 can include a location for the third descriptor with at least a simple number representing a start block address for locating the saved descriptor for each key value pair that was stored in the non-volatile memory device.

In an embodiment, the memory structure 300 can include a fourth entry 368 with a fourth key 374, a fourth value 376, or combination thereof. The fourth value 376 can include a key value index node (KVInode) Number, an address, a location, or combination thereof, for a fourth descriptor such as key value index node (KVInode) data, the descriptor 224, or combination thereof. The fourth key 374 can include a reference, a key, version of a key, or combination thereof, of the fourth descriptor such as the descriptor 224. For example, in a manner similar to the first entry 308, the fourth value 376 can include a location for the fourth descriptor with at least a simple number representing a start block address for locating the saved descriptor for each key value pair that was stored in the non-volatile memory device.

In an embodiment, the memory structure 300 can include a fifth entry 388 with a fifth key 394, a fifth value 396, or combination thereof. The fifth value 396 can include a key value index node (KVInode) Number, an address, a location, or combination thereof, for a fifth descriptor such as key value index node (KVInode) data, the descriptor 224, or combination thereof. The fifth key 394 can include a reference, a key, version of a key, or combination thereof, of the fifth descriptor such as the descriptor 224. For example, in a manner similar to the first entry 308, the fifth value 396 can include a location for the fifth descriptor with at least a simple number representing a start block address for locating the saved descriptor for each key value pair that was stored in the non-volatile memory device.

For illustrative purposes, the memory structure 300 is shown with five entries, such as the first entry 308, the second entry 328, the third entry 348, the fourth entry 368, the fifth entry 388, or combination thereof, although it is understood that any number of entries may be included. Further, it is understood that the entries of the memory structure 300 can include any value, content, information, format, or combination thereof.

It has been discovered that the first entry 308, the second entry 328, the third entry 348, the fourth entry 368, the fifth entry 388, similar additional entries, any entries, or combination thereof, can at least provide a location for saved descriptors in a non-volatile memory device. The first entry 308, the second entry 328, the third entry 348, the fourth entry 368, the fifth entry 388, similar additional entries, any entries, or combination thereof, can at least include a simple number representing a start block address for locating the saved descriptor for each key value pair that was stored in the non-volatile memory device.

Figure 4:
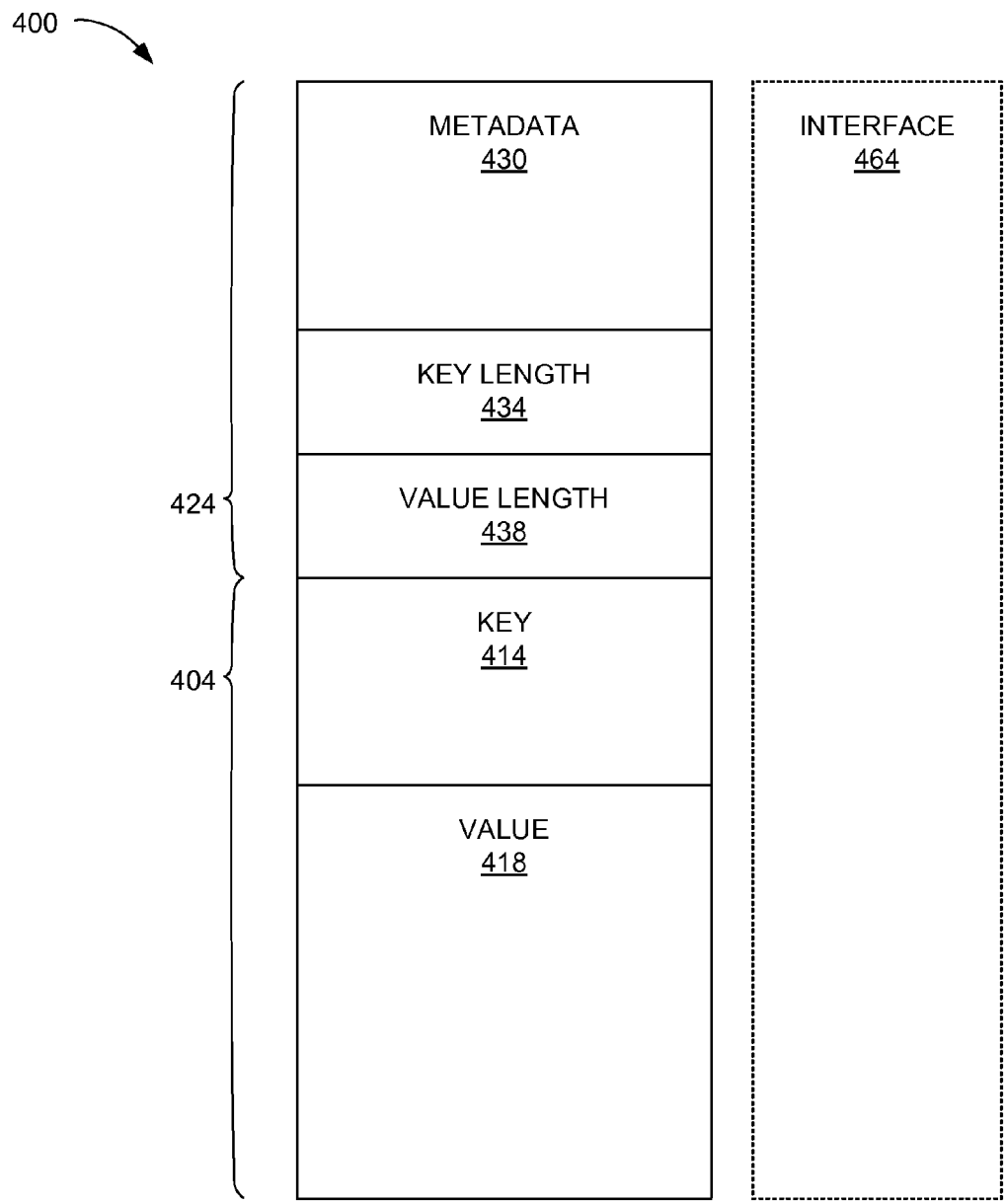
FIG. 4 is a storage structure of the electronic system in an embodiment of the invention.

Referring now to FIG. 4, therein is shown a storage structure 400 of the electronic system 100 in an embodiment of the invention. The memory structure 400, such as a key value index node (KVInode), the descriptor 224 of FIG. 2, or combination thereof, can be implemented in a storage system such as the electronic system 200 of FIG. 2 including the descriptor 224. The storage system can include a storage device such as the storage device 204 of FIG. 2, the first storage unit 114 of FIG. 1, the second storage unit 146 of FIG. 1, any storage device, a non-volatile storage device, or combination thereof.

In an embodiment, the memory structure 400 can include information about key value pairs. An entry such as the entry 228 of FIG. 2, the first entry 308 of FIG. 3, the second entry 328, the third entry 348, the fourth entry 368, the fifth entry 388, similar additional entries, any entries, or combination thereof, can be associated with a unique memory structure 400 in the storage device. The entry can include a key, such as the key 234, the first key 314, the second key 334, the third key 354, the fourth key 374, the fifth key 394, similar additional keys, any keys, or combination thereof, associated with each key value pair and any associated information.

In an embodiment, the memory structure 400 can include information for a key value pair 404 including a key 414 and a value 418. A header 424, such as a KVInode header, can include metadata 430, key length 434, value length 438, or combination thereof. The key 414 can be provided to a tree such as a binary or a hash tree, the memory structure 300 of FIG. 3, the tree 218 of FIG. 2, or combination thereof. The key 414 can be retrieved from the tree 218 to provide a location of the associated memory structure 400. For illustrative purposes, the storage structure 400 is shown with the key value pair 404, the key 414, the value 418, the header 424, the metadata 430, the key length 434, and the value length 438, although it is understood that the storage structure 400 can include any number or any type of component.

In an embodiment, the key value pair 404 can be stored in the storage, such as a non-volatile storage, in a new block of a new logical block addressing (LBA), bytes offset within a partially used logical block addressing (LBA), or combination thereof. The memory structure 400 can be written to the new block of the new logical block addressing (LBA), the bytes offset within the partially used logical block addressing (LBA), or combination thereof. An entry such as a tree node, a binary tree node, the entry 228 of FIG. 2, the first entry 308 of FIG. 3, or combination thereof, can include the key 414 and the value 418 including a start address. The entry or tree node can be included in a tree such as a binary tree, a hash tree, an index, mapping information, the tree 218 of FIG. 2, the memory structure 300 of FIG. 3, or combination thereof.

In an embodiment, an operation, such as a basic key value operation, can include an interface 464, such as a firmware interface, that can provide writing, updating, inserting, iterating, deleting, or combination thereof, of the storage structure 400. The storage structure can optionally include the interface 464 depicted by the block having a dotted line. The interface 464 can be implemented in hardware with the first control unit 112 of FIG. 1, the second control unit 134 of FIG. 1, the control device 212 of FIG. 2, the first storage unit 114, the second storage unit 146, the storage device 204, or combination thereof.

It has been discovered that the storage structure 400 can provide information about key value pairs including a location of the associated memory structure 400. The storage structure 400 can include the key 414, the value 418, the metadata 430, the key length 434, the value length 438, or combination thereof.

It has been discovered that the interface 464, such as a firmware interface, that can provide writing, updating, inserting, iterating, deleting, or combination thereof, of the storage structure 400. The interface 464 can provide writing, updating, inserting, iterating, deleting, or combination thereof, based on pattern matching of the storage structure 400.

Figure 5:
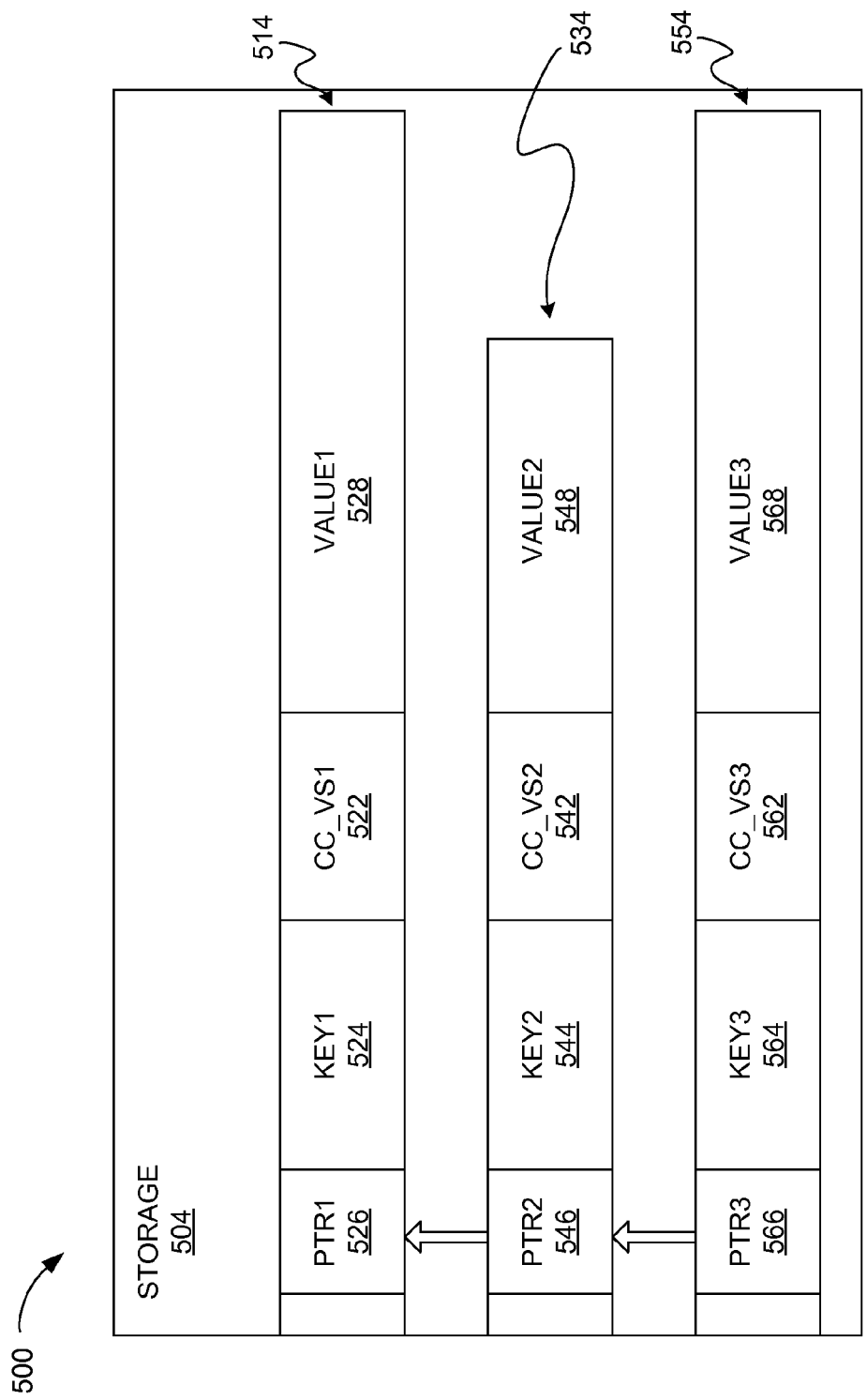
FIG. 5 is a storage structure of the electronic system in an embodiment of the invention.

Referring now to FIG. 5, therein is shown a storage structure 500 of the electronic system 100 in an embodiment of the invention. The memory structure 500, such as a linked list, can provide key storage for including multiple versions of a key or a descriptor such as the descriptor 224 of FIG. 2, the storage structure 400 of FIG. 4, or combination thereof. For illustrative purposes, the memory structure 500 is shown with three versions of the key although it is understood that any number of versions may be included in the memory structure 500.

In an embodiment, all versions of a key value (KV) pair can be chained on a memory device or storage device such as a non-volatile memory, in a manner similar to the memory structure 300 of FIG. 3, the tree 218 of the electronic system 200, or combination thereof. An actual KVInode of the new version on a memory, such as a non-volatile memory, can hold the KVInode number or LBA locations of previous versions forming a reverse chain of all versions of a KV pair on the memory.

In an embodiment, an update operation for a particular key can create a new version of a key-value pair. The new version can be inserted at a logical block addressing (LBA) location, such as a new LBA location, thus maintaining older versions at other LBA locations, such as older LBA locations. A hash tree node associated with the key can be updated to hold a key value index node (KVInode) number of a new version. For example, the KVInode of the new version on a memory, such as a non-volatile memory, can hold the KVInode number or LBA location of a previous version. One or more of the previous versions can provide a linked list of versions in the memory.

In an embodiment, the memory structure 500 can provide tracking of all operations or accesses, for example insert, update, iterate, read, delete, state change, other storage operations, or combination thereof. The electronic system 100 can provide a unique identification (ID) for each operation such as a concurrency control version stamp (cc_vs).

For example, a read operation, an iterate operation, or combination thereof, can include an input, such as a concurrency control version stamp (cc_vs), that can be an output of another operation such as an insert, an update, a delete, or combination thereof. The read operation can read a version of a key representing a snapshot of a store identified by the cc_vs, supporting Snapshot Isolation (SI).

In an embodiment, the memory structure 500 can include a storage device 504, a first descriptor 514 having a first concurrency control version stamp 522, a first key 524, a first pointer 526, a first value 528, or combination thereof. A second descriptor 534 can include a second concurrency control version stamp 542, a second key 544, a second pointer 546, a second value 548, or combination thereof. A third descriptor 554 can include a third concurrency control version stamp 562, a third key 564, a third pointer 566, a third value 568, or combination thereof.

For example, the first descriptor 514, the second descriptor 534, the third descriptor 554, similar additional descriptors, or combination thereof, can provide key value index node (KVInode) data in a manner similar to the descriptor 224, the storage structure 400, or combination thereof. The first descriptor 514 can represent a first version such as V1, the second descriptor 534 represents a second version such as V1', the third descriptor 554 represents a third version such as V1".

In an embodiment, the first key 524, the second key 544, and the third key 564, can represent multiple versions of a key such as the key 234 of FIG. 2, the key 314 of FIG. 3, the key 334 of FIG. 3, the key 354 of FIG. 3, the key 374 of FIG. 3, the key 394 of FIG. 3, or the key 414 of FIG. 4. For example, the first key 524 can represent the first key value 528 such as VALUE1, second key 544 can represent the second key value 548 such as VALUE2', and the third key 564 can represent the third key value 568 such as VALUE3". For illustrative purposes, three versions of the key are shown, the first key 524, the second key 544, and the third key 564, although it is understood that any number of versions may be included.

In an embodiment, the first pointer 526, the second pointer 546, the third pointer 566, similar additional pointers, or combination thereof can include a logical block addressing pointer (LBA_Ptr) for pointing, linking, or coupling, multiple versions of the descriptors. The first descriptor 514, the second descriptor 534, the third descriptor 554, similar additional descriptors, or combination thereof, can be linked on the storage device 504, such as the first storage unit 114 of FIG. 1, the second storage unit 146 of FIG. 1, the storage device 204 of FIG. 2, or combination thereof.

In an embodiment, the first concurrency control version stamp 522, the second concurrency control version stamp 542, the third concurrency control version stamp 562, any version stamp, or combination thereof, can represent an output of an operation such as insert, update, iterate, read delete, or combination thereof. Outputs of insert operations, update operations, iterate operations, read operations, delete operations, or combination thereof, can provide inputs to the storage structure 500 of the electronic system 100.

For example, the third descriptor 554 can include a newest version of the key value such as VALUE3", the second descriptor 534 can include an older version of the key value such as VALUE2', and the first descriptor 514 can include an oldest version of a key value such as VALUE1. The third pointer 566 associated with the newest version of the key can point to the second pointer 546 associated with the older version of the key. Similarly, the second pointer 546 associated with the older version of the key can point to the first pointer 526 associated with the oldest version of the key. The electronic system 100 with storage structure 500 can provide a descriptor such as the descriptor 224 with multiple versions linked on the storage device 504 such as the storage device 204.

It has been discovered that the storage system 500 provides a linked list with all versions of a key value (KV) pair chained on the storage device 504. The first pointer 526, the second pointer 546, the third pointer 566, or combination thereof, can point, link, or couple, multiple versions of the descriptors such as the first descriptor 514, the second descriptor 534, the third descriptor 554, or combination thereof.

It has been discovered that the electronic system 200 including the storage 204 with the descriptor 224 and the memory 208 with the tree 218 can require only one input and output (IO) operation for writing a new version on or in a storage medium. The descriptor 224 can include the storage structure 500 having a linked list accessed with the tree 218 for operations by a single input and output (I/O) access.

Figure 6:
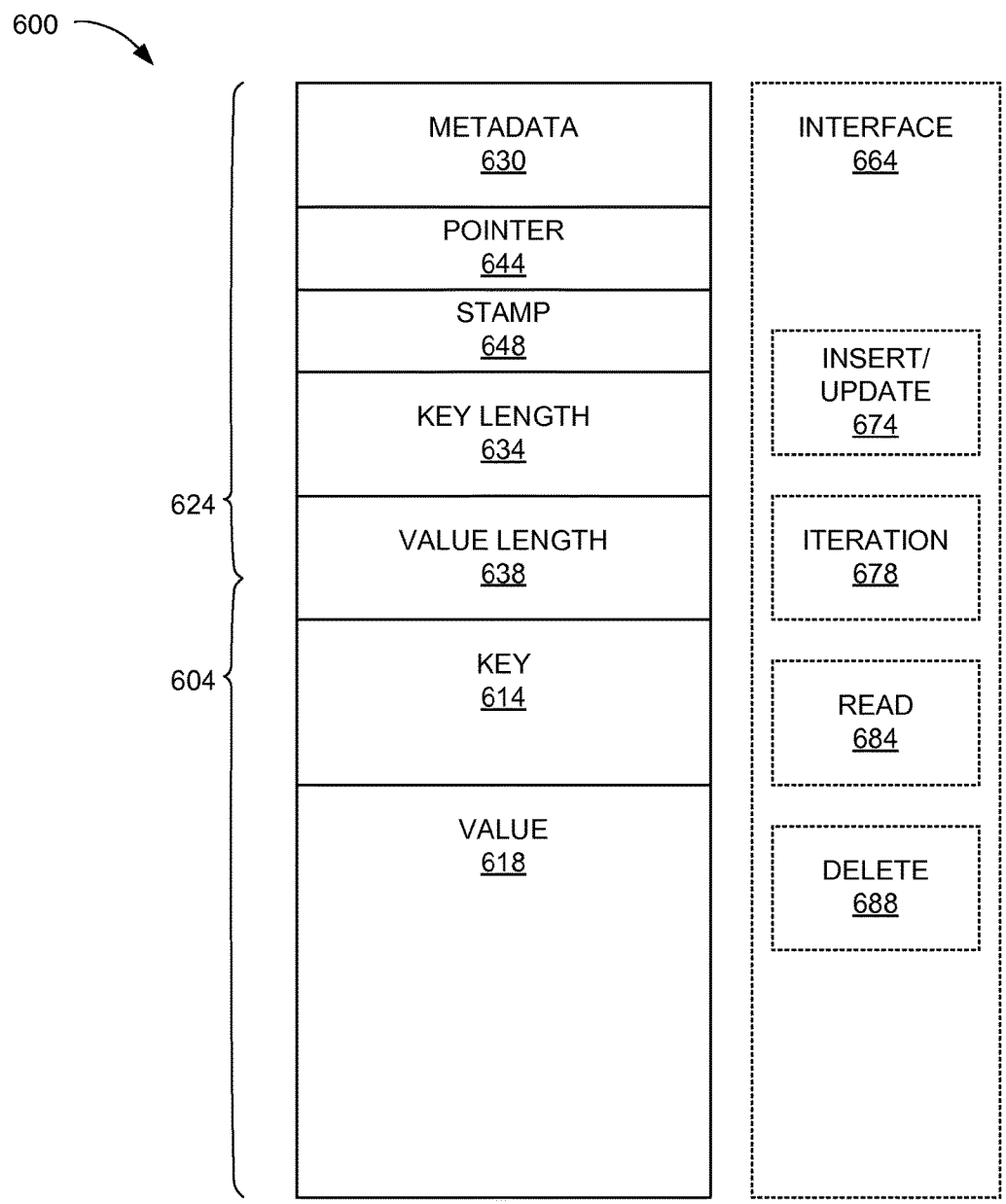
FIG. 6 is a storage structure of the electronic system in an embodiment of the invention.

Referring now to FIG. 6, therein is shown a storage structure 600 of the electronic system 100 in an embodiment of the invention. The memory structure 600, such as a key value index node (KVInode), the descriptor 224 of FIG. 2, or combination thereof, can include a location such as key value index node (KVInode), a logical block addressing (LBA) location, or combination thereof, with fields for supporting access such as multi-version concurrency control (MVCC), snapshot isolation (SI), or combination thereof.

In an embodiment, the memory structure 600 can provide tracking of all operations, for example insert, update, iterate, read, delete, state change, other storage operations, or combination thereof. The electronic system 100 can provide a unique identification (ID) for each operation such as a concurrency control version stamp (cc_vs)

For example, a read operation, an iterate operation, or combination thereof, can include an input, such as a concurrency control version stamp (cc_vs), that can be an output of an operation such as an insert, an update, a delete, or combination thereof, such as provided by the interface 464 of FIG. 4. The read operation can read a version of a key representing a snapshot of a store identified by the cc_vs supporting Snapshot Isolation (SI).

In an embodiment, the Snapshot Isolation (SI) can be supported by tracking each operation, such as insert, update, iterate, read, delete, or combination thereof, which changes a state of a database. Each operation that changes the state of the database can result in an increasing value for a transaction identification (ID) number such as a concurrency control version stamp (cc_vs). A read operation, an iterate operation, or combination thereof, can include the transaction ID number as an input for reading a version of a key that represents a snapshot created when the operation with the input transaction ID was implemented or executed.

In an embodiment, the memory structure 600 can include information about key value pairs. An entry such as the entry 228 of FIG. 2, the first entry 308 of FIG. 3, the second entry 328, the third entry 348, the fourth entry 368, the fifth entry 388, similar additional entries, any entries, or combination thereof, can be associated with a unique memory structure 600 in the storage device. The entry can include a key, such as the key 234, the first key 314, the second key 334, the third key 354, the fourth key 374, the fifth key 394, similar additional keys, any keys, or combination thereof, associated with each key value pair and any associated information.

In an embodiment, the memory structure 600 can include information for a key value pair 604 including a key 614 and a value 618. A header 624, such as a KVInode header, can include metadata 630, key length 634, value length 638, a pointer 644, a stamp 648, or combination thereof. These fields can be included in the memory structure 600 for multi-version concurrency control (MVCC) support, snapshot isolation (SI) support, or combination thereof.

In an embodiment, the pointer 644 can include a logical block addressing pointer (LBA_Ptr) for pointing to another location. The stamp 648 can include a concurrency control version stamp (cc_vs) that can be incremented based on operations. The key 614 can be provided to a tree such as a hash tree, a binary tree, the memory structure 300 of FIG. 3, the tree 218 of FIG. 2, or combination thereof. The key 614 can be retrieved from the tree 218 to provide a location of the associated memory structure 400. For illustrative purposes, the storage structure 600 is shown with the key value pair 604, the key 614, the value 618, the header 624, the metadata 630, the key length 634, the value length 638, the pointer 644, and the stamp 648, although it is understood that the storage structure 600 can include any number or any type of component.

In an embodiment, an insert block 674 can provide an insert operation, an update operation, or combination thereof, including incrementing a stamp 648, such as a concurrency control version stamp (cc_vs), a global concurrency control version stamp, or combination thereof. The stamp 648 can provide a unique identifier such as a unique stamp 648 for an operation. For example, an application can store more than one older revision of a key for SI by storing a new revision of the key at a different LBA location and having a hash tree updated with the new or different LBA location. The insert block 674 can provide metadata for the new LBA location, which can also include an LBA location of an older revision in a key header for forming a reverse chain from the new version to the older or oldest version.

In an embodiment, an iteration block 678 can provide an iteration operation, including an input, such as the stamp 648. The iteration block 678 can fetch a key value pair that exists based on predetermined criteria. For example, the iteration block 678 can fetch the key value pair that has a stamp 648 with a value that is less than or equal to the value of the input stamp 648.

In an embodiment, a read block 684 providing a read operation, can provide reading of a latest consistent revision of a key value pair. For example, an older revision, with a stamp 648 having a value that is less than or equal to the input stamp 648, can be read based on concurrent writing of a latest revision of a key value pair.

In an embodiment, a delete block 688 providing a delete operation, can provide invalidation of a key value pair. The delete block 688 can invalidate the key value pair record of a hash tree, increment the value of the stamp 648, store the value of the stamp 648 for the invalidated key value pair in the hash tree, or combination thereof. For example, an actual trim or delete operation can be implemented asynchronously with the delete operation such as implemented at a different or later time.

In an embodiment, operations can be performed by hardware devices or implemented in hardware. The insert block 674, the iteration block 678, the read block 684, the delete block 688, can be implemented in hardware with the first control unit 112 of FIG. 1, the second control unit 134 of FIG. 1, the control device 212 of FIG. 2, the first storage unit 114, the second storage unit 146, the storage device 204, or combination thereof.

In an embodiment, an operation, such as a basic key value operation, can include an interface 664, such as a firmware interface, in a manner similar to the operation including the interface 464 of FIG. 4. The interface 664 can support multi-version concurrency control (MVCC) and snapshot isolation (SI).

It has been discovered that the storage structure 600 can provide information about key value pairs including a location of the associated memory structure 600. The storage structure 600 can include the key 614, the value 618, the metadata 630, the key length 634, the value length 638, the pointer 644, the stamp 648, or combination thereof.

It has been discovered that the interface 664, such as a firmware interface, that can provide writing, updating, inserting, iterating, deleting, or combination thereof, of the storage structure 600. The interface 664 can provide writing, updating, inserting, iterating, deleting, or combination thereof, based on pattern matching of the storage structure 600.

Figure 7:
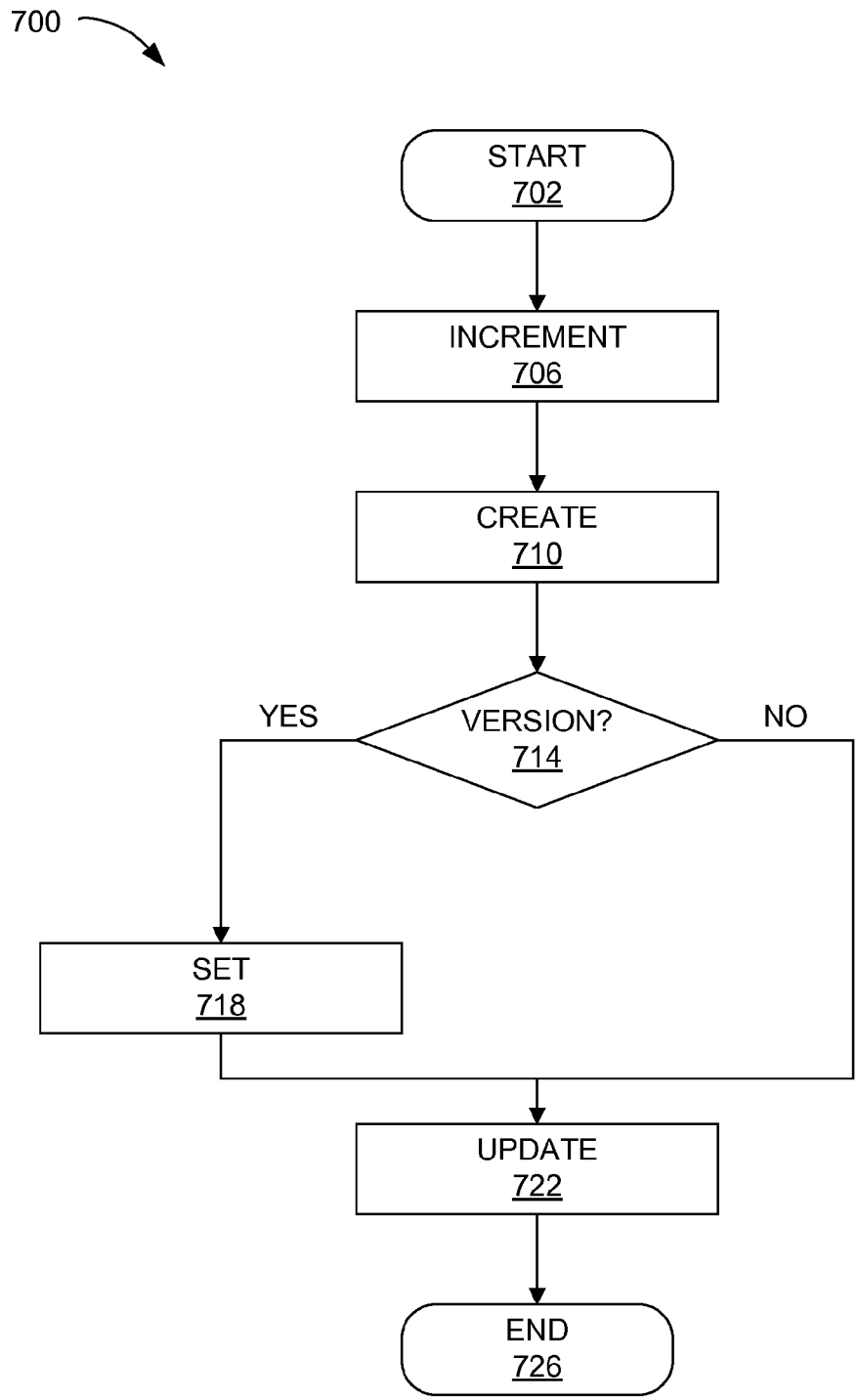
FIG. 7 is an insert process flow of the electronic system in an embodiment of the invention.

Referring now to FIG. 7, therein is shown an insert process flow 700 of the electronic system 100 in an embodiment of the invention. The insert process flow 700 can also provide an update process such as an update process flow for inserting or updating a number such as the value 236 of FIG. 2, the first value 316 of FIG. 3, the second value 336 of FIG. 3, the third value 356 of FIG. 3, the fourth value 376 of FIG. 3, the fifth value 396 of FIG. 3, key value index nodes, or combination thereof, in a tree such as the tree 218 of FIG. 2, the memory structure 300 of FIG. 3, or combination thereof.

In an embodiment, the insert process flow 700 can be implemented with hardware including the storage device 204 of FIG. 2, the memory device 208 of FIG. 2, the first storage unit 114 of FIG. 1, the second storage unit 146 of FIG. 1, or combination thereof. For example, the storage device 204, the memory device 208, or combination thereof, can be implemented in the first storage unit 114, the second storage unit 146, or combination thereof.

In an embodiment, the insert process flow 700 can be implemented with hardware including the control device 212 of FIG. 2, such as the first control unit 112 of FIG. 1, the second control unit 134 of FIG. 1, or combination thereof, and can be coupled to the memory device 208, the storage device 204, other disclosed devices, any device, or combination thereof. For example, the control device 212 and the memory 208 can be included in the first device 102 of FIG. 1.

For example, in a manner similar to the insert block 674 of FIG. 6, each insert or update operation can include incrementing a global concurrency control version stamp and the insert or update operation can be given a unique identification such as a concurrency control version stamp. More than one older revision of a key for snapshot isolation can be stored, with a new revision stored at a different logical block addressing (LBA) location.

In an embodiment, the insert process flow 700 or update process flow can include a start operation 702, an increment operation 706, a create operation 710, a version operation 714, a set operation 718, an update operation 722, an end operation 726, or combination thereof. Each of the start operation 702, the increment operation 706, the create operation 710, the version operation 714, the set operation 718, the update operation 722, the end operation 726, or combination thereof, can be implemented with hardware in a manner similar to the insert process flow 700.

In an embodiment, the increment operation 706 can increment a stamp for an input key, version of a key, or combination thereof. The stamp can include a concurrency control version stamp or a timestamp, such as the first concurrency control version stamp 522 of FIG. 5, the second concurrency control version stamp 542 of FIG. 5, third concurrency control version stamp 562 of FIG. 5, any version stamp, any timestamp, or combination thereof.

In an embodiment, the create operation 710 can create a key value index node, key value, metadata, a concurrency control version stamp, a timestamp, or combination thereof. For example, create operation 710 can create or fill entries such as the entry 228 of FIG. 2, the first entry 308 of FIG. 3, the second entry 328, the third entry 348, the fourth entry 368, the fifth entry 388, similar additional entries, any entries, or combination thereof.

In an embodiment, the version operation 714 can determine a previous version of key value for the key. Based on whether a previous version exists, the version operation 714 can determine a next process or operation of the insert process flow 700.

In an embodiment, the set operation 718 can be invoked by the version operation 714 based on an existing previous version of the key value. The set operation 718 can set a pointer to a previous version of the key value. The pointer can include the first pointer 526 of FIG. 5, the second pointer 546 of FIG. 5, the third pointer 566 of FIG. 5, the pointer 644 of FIG. 6, any pointer, or combination thereof.

In an embodiment, the update operation 722 can update a tree, such as a hash tree, binary tree, index, data structure, mapping information, or combination thereof. The update to the tree can include updating an entry with a new key value index node number. The update operation 722 can be based on the set operation 718, the version operation 714, or combination thereof. For example, version operation 714 can determine that "yes" a previous version of a key value exists and the set operation 718 can provide a pointer to the previous version for the update operation 722. Alternatively for example, the version operation 714 can determine that "no" a previous version of a key value does not exist and the update operation 722 is invoked.

Figure 8:
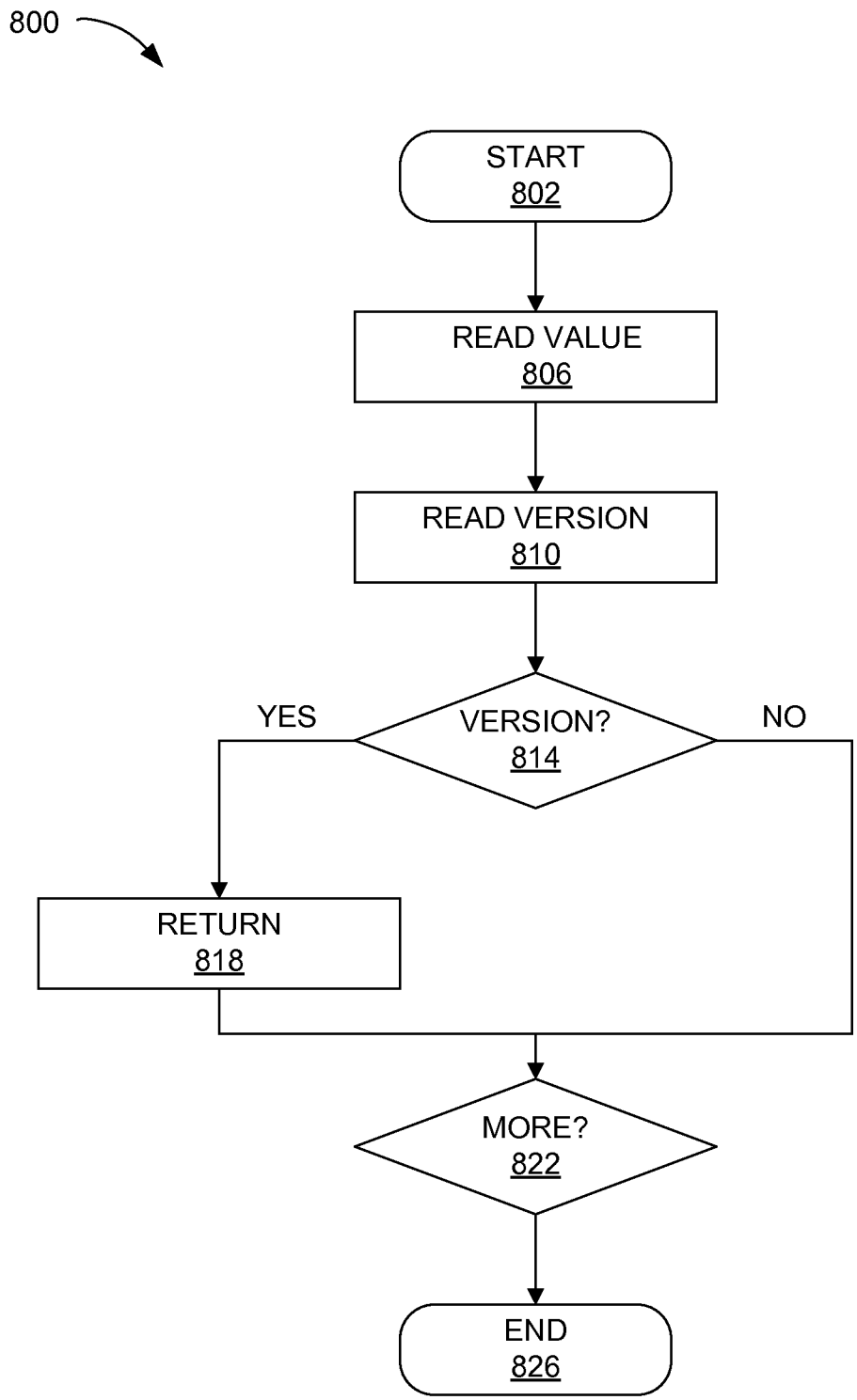
FIG. 8 is an iterate process flow of the electronic system in an embodiment of the invention.

Referring now to FIG. 8, therein is shown an iteration process flow 800 of the electronic system 100 in an embodiment of the invention. The iteration process flow 800 can receive a version stamp, such as a concurrency control version stamp (cc_vs). The iteration process can retrieve a key value pair that includes a version less than or equal to the current cc_vs in a manner similar to the iteration block 678 of FIG. 6.

In an embodiment, the iteration process flow 800 can be implemented with hardware including the storage device 204 of FIG. 2, the memory device 208 of FIG. 2, the first storage unit 114 of FIG. 1, the second storage unit 146 of FIG. 1, or combination thereof. For example, the storage device 204, the memory device 208, or combination thereof, can be implemented in the first storage unit 114, the second storage unit 146, or combination thereof.

In an embodiment, the iteration process flow 800 can be implemented with hardware including the control device 212 of FIG. 2, such as the first control unit 112 of FIG. 1, the second control unit 134 of FIG. 1, or combination thereof, can be coupled to the memory device 208, the storage device 204, other disclosed devices, any device, or combination thereof. For example, the control device 212 and the memory 208 can be included in the first device 102 of FIG. 1.

In an embodiment, the iteration process flow 800, can include a start operation 802, a read value operation 806, a read version 810 operation, a version operation 814, a return operation 818, a more operation 822, an end operation 826, or combination thereof. Each of the start operation 802, the read value operation 806, the read version 810 operation, the version operation 814, the return operation 818, the more operation 822, the end operation 826, or combination thereof, can be implemented with hardware in a manner similar to the iteration process flow 800.

In an embodiment, the read value operation 806 can read a key value pair from a key value store device. The key value pair such as the key value pair 404 of FIG. 4, the key value pair 604 of FIG. 6, any key value pair, or combination thereof, can be read from a key value store such as the storage structure 400 of FIG. 4, the storage structure 600 of FIG. 6, any storage, or combination thereof.

In an embodiment, the read version 810 operation can read a concurrency control version stamp (cc_vs) value of the key value pair. The concurrency control version stamp (cc_vs) can include values of the first concurrency control version stamp 522 of FIG. 5, the second concurrency control version stamp 542 of FIG. 5, the third concurrency control version stamp 562 of FIG. 5, any version stamp, or combination thereof.

In an embodiment, the version operation 814 can compare a received concurrency control version stamp (cc_vs) with a current cc_vs and determine if the received version is less than or equal to current version. The version operation 814 can determine a positive outcome ("yes") or a negative outcome ("no") to determine a next process or operation of the iteration process flow 800.

In an embodiment, the return operation 818 can be invoked by the version operation 814 based on the comparison of the received cc_vs with a current cc_vs. The return operation 818 can provide or return a key value index node such as the value 236 of FIG. 2, the first value 316 of FIG. 3, the second value 336 of FIG. 3, the third value 356 of FIG. 3, the fourth value 376 of FIG. 3, the fifth value 396 of FIG. 3, key value index nodes, or combination thereof.

In an embodiment, the more operation 822 can determine if more key value pairs are in the key value store to determine a next process or operation of the iteration process flow 800. For example, the more operation 822 can determine that "yes" there are more key value pairs and invoke the read value operation 806. Alternatively for example, the more operation 822 can determine that "no" there are no more key value pairs and invoke the end operation 826.

Figure 9:
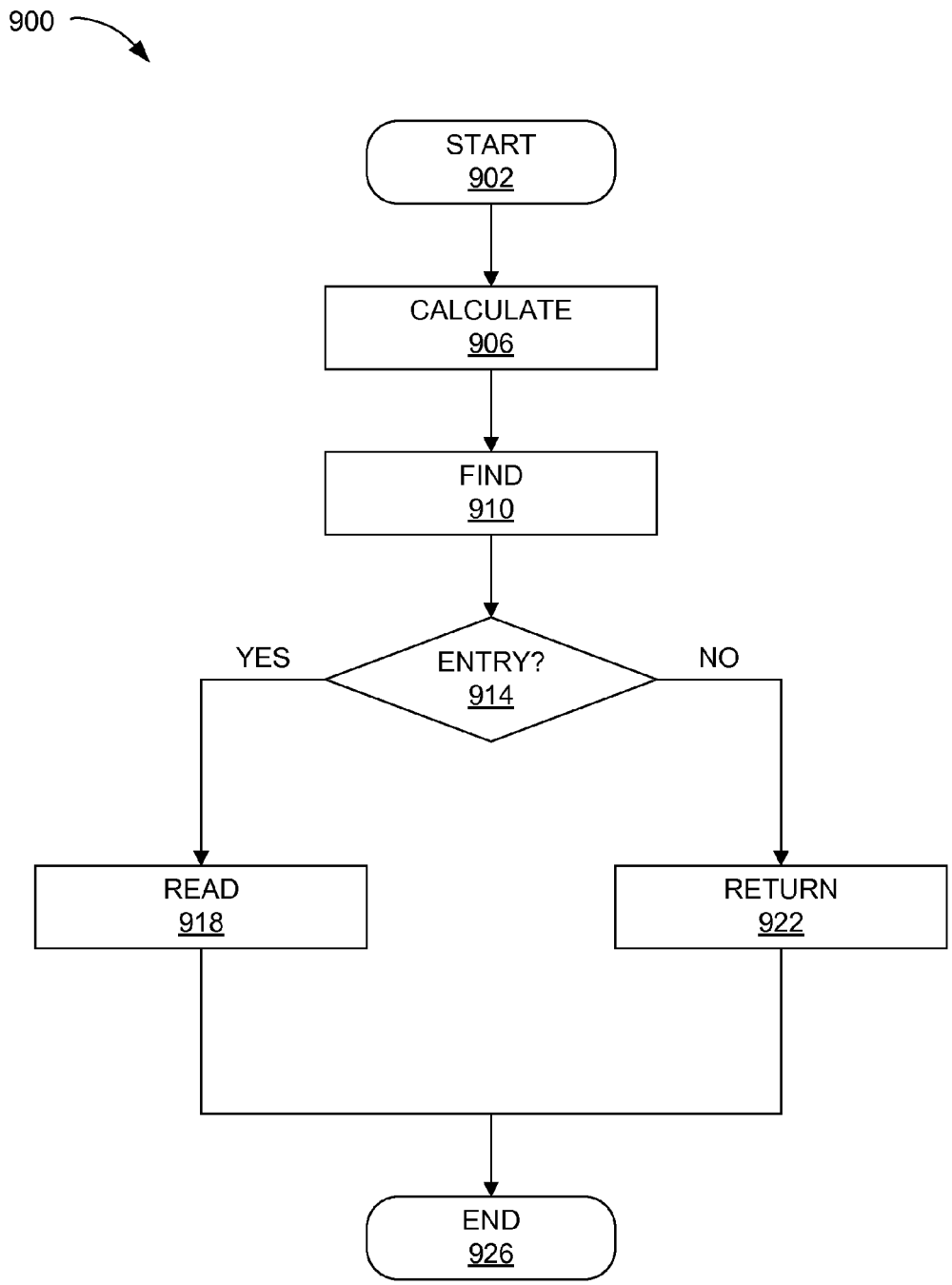
FIG. 9 is a read process flow of the electronic system in an embodiment of the invention.

Referring now to FIG. 9, therein is shown a read process flow 900 of the electronic system in an embodiment of the invention. The read process flow 900 can read a latest consistent revision or version of a key value pair. The read process flow 900 can determine the latest consistent revision based on concurrent writing of a key value pair and determining an input version stamp in a manner similar to the read block 684 of FIG. 6.

In an embodiment, the read process flow 900 can be implemented with hardware including the storage device 204 of FIG. 2, the memory device 208 of FIG. 2, the first storage unit 114 of FIG. 1, the second storage unit 146 of FIG. 1, or combination thereof. For example, the storage device 204, the memory device 208, or combination thereof, can be implemented in the first storage unit 114, the second storage unit 146, or combination thereof.

In an embodiment, the read process flow 900 can be implemented with hardware including the control device 212 of FIG. 2, such as the first control unit 112 of FIG. 1, the second control unit 134 of FIG. 1, or combination thereof, can be coupled to the memory device 208, the storage device 204, other disclosed devices, any device, or combination thereof. For example, the control device 212 and the memory 208 can be included in the first device 102 of FIG. 1.

In an embodiment, the read process flow 900 can include a start operation 902, a calculate operation 906, a find operation 910, an entry operation 914, a read operation 918, a return operation 922, an end operation 926, or combination thereof. Each of the start operation 902, the calculate operation 906, the find operation 910, the entry operation 914, the read operation 918, the return operation 922, the end operation 926, or combination thereof, can be implemented with hardware in a manner similar to the read process flow 900.

In an embodiment, the calculate operation 906 can calculate a value such as a hash value, a binary value, an index value, a mapping value, a tree value, or combination thereof. The value can be calculated based on a key such as the key value pair 404 of FIG. 4, the key value pair 604 of FIG. 6, any key value pair, or combination thereof.

In an embodiment, the find operation 910 can find a key with the calculated value in a tree. The calculated value can include a hash value, a binary value, an index value, a mapping value, or combination thereof. The tree can include the tree 218 of FIG. 2, the memory structure 300 of FIG. 3, or combination thereof.

In an embodiment, the entry operation 914 can determine if a key entry is in the tree. The key entry can include the entry 228 of FIG. 2, the first entry 308 of FIG. 3, the second entry 328, the third entry 348, the fourth entry 368, the fifth entry 388, similar additional entries, any entries, or combination thereof.

In an embodiment, the read operation 918 can be invoked based on a "yes" that the key entry is in the tree by the entry operation 914. Based on the "yes" the key entry is in the tree, the read operation 918 can read a value of the key from a key value index node location in the tree. The value of the key or key value can include the value 418 of FIG. 4, the first key value 528 of FIG. 5, the second key value 548 of FIG. 5, and the third key value 568 of FIG. 5, the value 618 of FIG. 6, or combination thereof.

In an embodiment, the return operation 922 can be invoked based on a "no" that the key entry is not in the tree by the entry operation 914. Based on the "no" the key entry is not in the tree, the return operation 922 can provide or return a "no key error" based on the key not found in entry operation 914.

Figure 10:
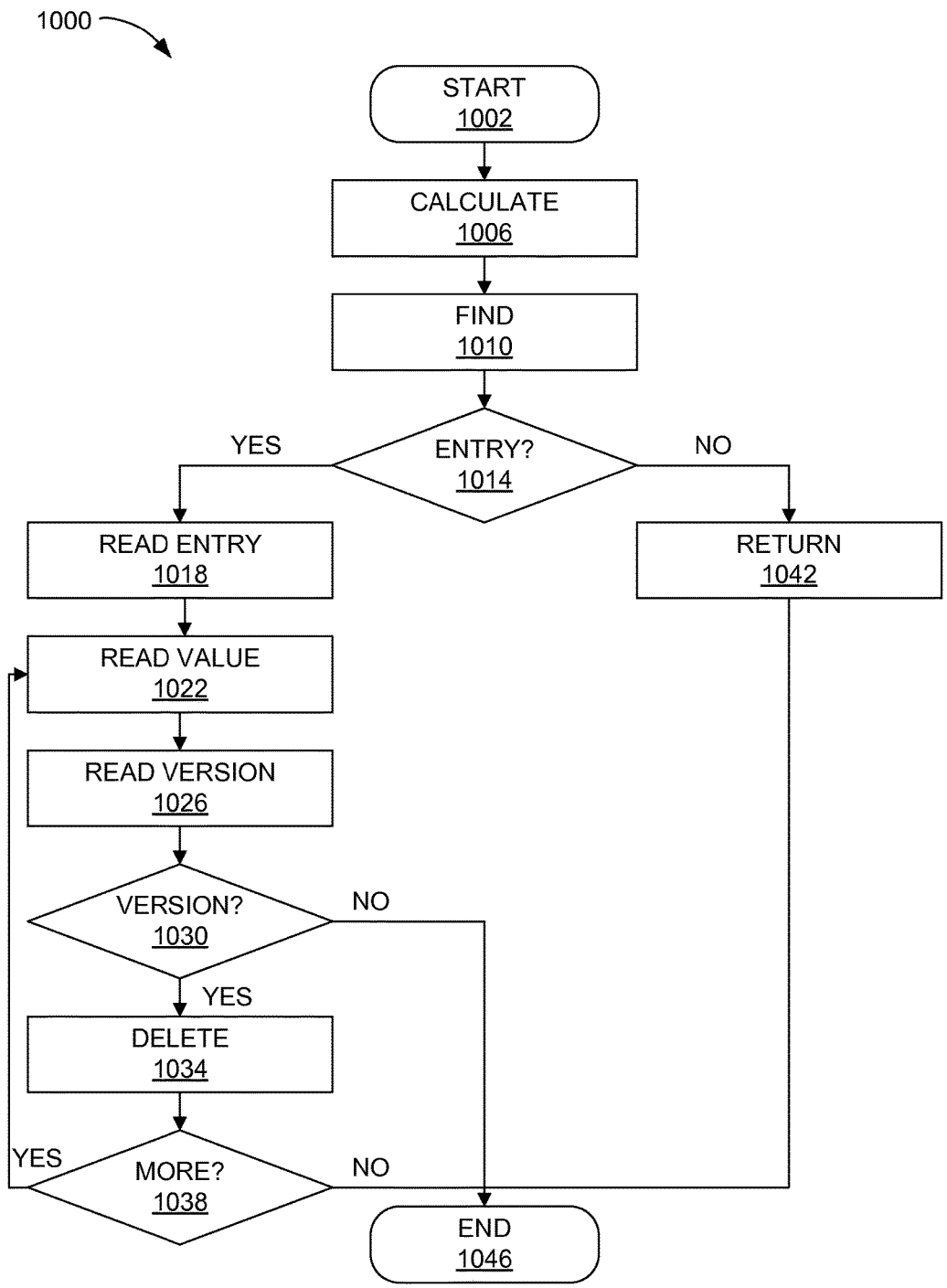
FIG. 10 is delete process flow of the electronic system in an embodiment of the invention.

Referring now to FIG. 10, therein is shown a delete process flow 1000 of the electronic system in an embodiment of the invention. The delete process flow 1000 can delete values based on a concurrency control version stamp (cc_vs) value less than or equal to an input cc_vs value from a key value store device. If all versions of a key value pair are intended for deletion, the key value pair record in the hash tree can be deleted. The delete process flow 1000 can provide functions in addition to, or in place of the functions of the delete block 688 of FIG. 8. For example in a manner similar to the delete block 688, the delete process flow 1000 can optionally invalidate a key value pair record of a hash tree, and implement a trim or delete of the key value pairs asynchronously at a different or later time.

In an embodiment, the delete process flow 1000 can be implemented with hardware including the storage device 204 of FIG. 2, the memory device 208 of FIG. 2, the first storage unit 114 of FIG. 1, the second storage unit 146 of FIG. 1, or combination thereof. For example, the storage device 204, the memory device 208, or combination thereof, can be implemented in the first storage unit 114, the second storage unit 146, or combination thereof.

In an embodiment, the delete process flow 1000 can be implemented with hardware including the control device 212 of FIG. 2, such as the first control unit 112 of FIG. 1, the second control unit 134 of FIG. 1, or combination thereof, can be coupled to the memory device 208, the storage device 204, other disclosed devices, any device, or combination thereof. For example, the control device 212 and the memory 208 can be included in the first device 102 of FIG. 1.

In an embodiment, the delete process flow 100 can include a start operation 1002, a calculate operation 1006, a find operation 1010, an entry process 1014, a read entry operation 1018, a read value operation 1022, a read version operation 1026, a version operation 1030, a delete operation 1034, a more operation 1038, a return operation 1042, an end operation 1046, or combination thereof. Each of the start operation 1002, the calculate operation 1006, the find operation 1010, the entry process 1014, the read entry operation 1018, the read value operation 1022, the read version operation 1026, the version operation 1030, the delete operation 1034, the more operation 1038, the return operation 1042, the end operation 1046, or combination thereof, can be implemented with hardware in a manner similar to the delete process flow 1000.

In an embodiment, the calculate operation 1006 can calculate a value such as a hash value, a binary value, an index value, a mapping value, a tree value, or combination thereof. The value can be calculated based on a key such as the key value pair 404 of FIG. 4, the key value pair 604 of FIG. 6, any key value pair, or combination thereof.

In an embodiment, the find operation 1010 can find a key with the calculated value in a tree. The calculated value can include a hash value, a binary value, an index value, a mapping value, or combination thereof. The tree can include the tree 218 of FIG. 2, the memory structure 300 of FIG. 3, or combination thereof.

In an embodiment, the entry operation 1014 can determine if a key entry is in the tree. The key entry can include the entry 228 of FIG. 2, the first entry 308 of FIG. 3, the second entry 328, the third entry 348, the fourth entry 368, the fifth entry 388, similar additional entries, any entries, or combination thereof.

In an embodiment, the read entry operation 1018 can be invoked based on a "yes" that the key entry is in the tree by the entry operation 1014. Based on the "yes" the key entry is in the tree, the read entry operation 1018 can read the entry 228 of FIG. 2 including a key value index number in the tree. The key value index can include the value 236 of FIG. 2, the first value 316 of FIG. 3, the second value 336 of FIG. 3, the third value 356 of FIG. 3, the fourth value 376 of FIG. 3, the fifth value 396 of FIG. 3, a key value index, or combination thereof.

In an embodiment, the read value operation 1022 can read key value pairs from a key value store based on the key value index number in a tree of the read entry operation 1018. The key value pairs can include the value 418 of FIG. 4, the first key value 528 of FIG. 5, the second key value 548 of FIG. 5, and the third key value 568 of FIG. 5, the value 618 of FIG. 6, or combination thereof. The key value store can include the storage structure 400 of FIG. 4, the storage structure 600 of FIG. 6, any storage, or combination thereof.

In an embodiment, the read version operation 1026 can read a concurrency control version stamp (cc_vs) value based on the key value pairs of the read value operation 1022. The concurrency control version stamp (cc_vs) can include values of the first concurrency control version stamp 522 of FIG. 5, the second concurrency control version stamp 542 of FIG. 5, the third concurrency control version stamp 562 of FIG. 5, any version stamp, or combination thereof.

In an embodiment, the version operation 1030 can compare a received concurrency control version stamp (cc_vs) with a current cc_vs and determine if the received version is less than or equal to current version. The version operation 1030 can determine a positive outcome ("yes") or a negative outcome ("no") to determine a next process or operation of the iteration process flow 1000.

In an embodiment, the delete operation 1034 can delete values, a key value pair, key value pairs, key value pair record in a hash tree, or combination thereof, based on the positive outcome ("yes") of the version operation 1030. Optionally, the actual trim or delete can be implemented asynchronously at a different time.

In an embodiment, the return operation 1042 can be invoked based on a "no" the key entry is not in the tree by the entry operation 1014. The return operation 1042 can provide or return a "no key error" based on the key not found in entry operation 1014.

In an embodiment, the more operation 1038 can determine if more key value pairs are in the key value store to determine a next process or operation of the iteration process flow 1000. For example, the more operation 1038 can determine that "yes" there are more key value pairs and invoke the read value operation 1022. Alternatively for example, the more operation 1038 can determine that "no" there are no more key value pairs and invoke the end operation 1046.

Figure 11:
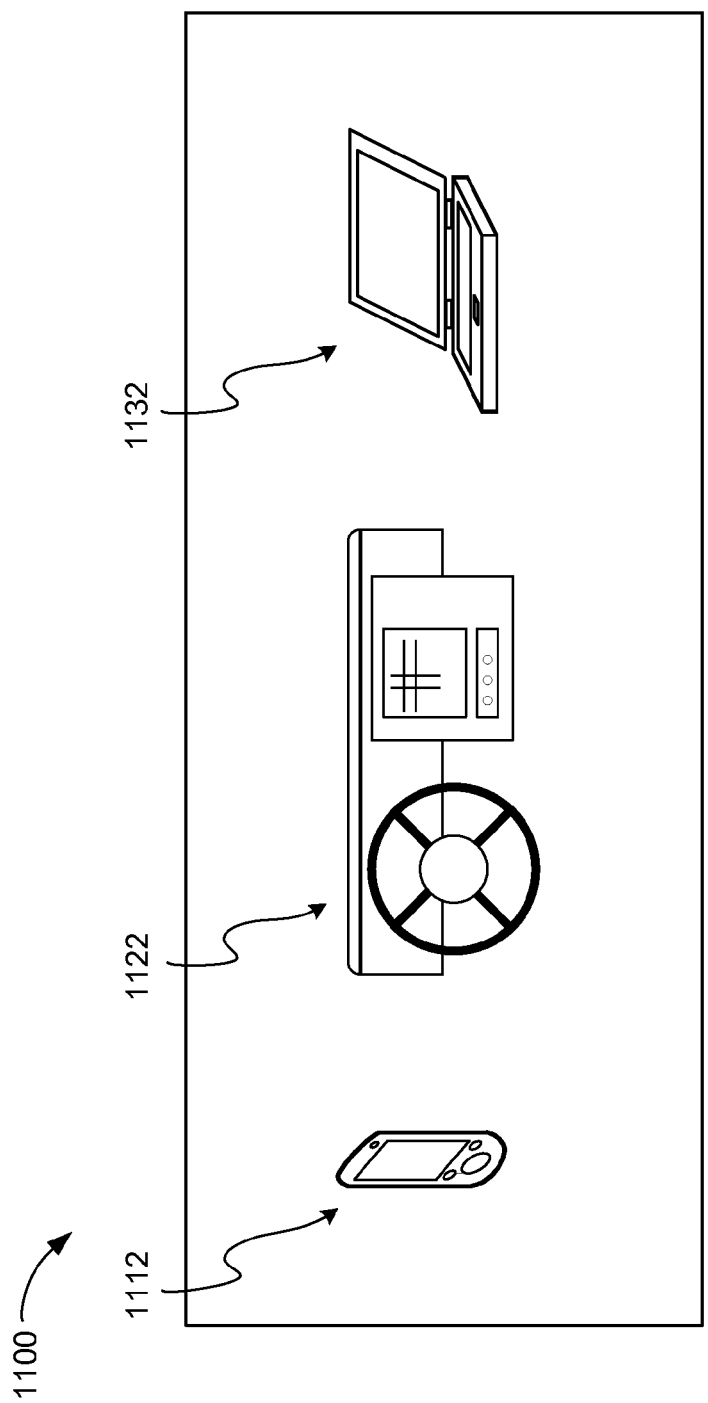
FIG. 11 is examples of embodiments of the electronic system.

Referring now to FIG. 11, therein is shown examples of embodiments of the electronic system 100. The embodiments can include application examples for the electronic system 100 such as a smart phone 1112, a dash board of an automobile 1122, a notebook computer 1132, or combination thereof.

These application examples illustrate purposes or functions of various embodiments of the invention and importance of improvements in version control including improving system performance, reducing input and output operations, eliminating redundant input and output operations, reducing the need for metadata at the application level, reducing system memory, or combination thereof.

For example, the memory structure 600 of FIG. 6 can maximize system performance, minimize overhead of the memory transactions, minimize area of the memory modules, minimize cost, minimize memory bandwidth consumption, eliminate memory bandwidth consumption, minimize memory transaction conflicts, eliminate memory transaction conflicts, or combination thereof.

In an example where an embodiment of the invention is an integrated physical logic circuit and the memory structure 300 of FIG. 3, the memory structure 500 of FIG. 5, the memory structure 600, or combination thereof, is integrated in the storage device 204, the first storage unit 114 of FIG. 1, the second storage unit 146 of FIG. 1, or combination thereof, transactions can be significantly reduced, such as requiring only one input and output (I/O) based on devices without the memory structure 300, the memory structure 500, the memory structure 600, or combination thereof.

Various embodiments of the invention provide optimizing operations, improving system performance, improving energy efficiency, enabling new memory technologies, enabling compatibility with current memory hierarchies, providing transparent implementation for user applications, or combination thereof.

The electronic system 100, such as the smart phone 1112, the dash board of the automobile 1122, and the notebook computer 1132, can include a one or more of a subsystem (not shown), such as a printed circuit board having various embodiments of the invention, or an electronic assembly (not shown) having various embodiments of the invention. The electronic system 100 can also be implemented as an adapter card in the smart phone 1112, the dash board of the automobile 1122, and the notebook computer 1132.

Thus, the smart phone 1112, the dash board of the automobile 1122, the notebook computer 1132, other electronic devices, or combination thereof, can provide significantly faster throughput with the electronic system 100 such as processing, output, transmission, storage, communication, display, other electronic functions, or combination thereof. For illustrative purposes, the smart phone 1112, the dash board of the automobile 1122, the notebook computer 1132, other electronic devices, or combination thereof, is shown although it is understood that the electronic system 100 can be used in any electronic device.

Figure 12:
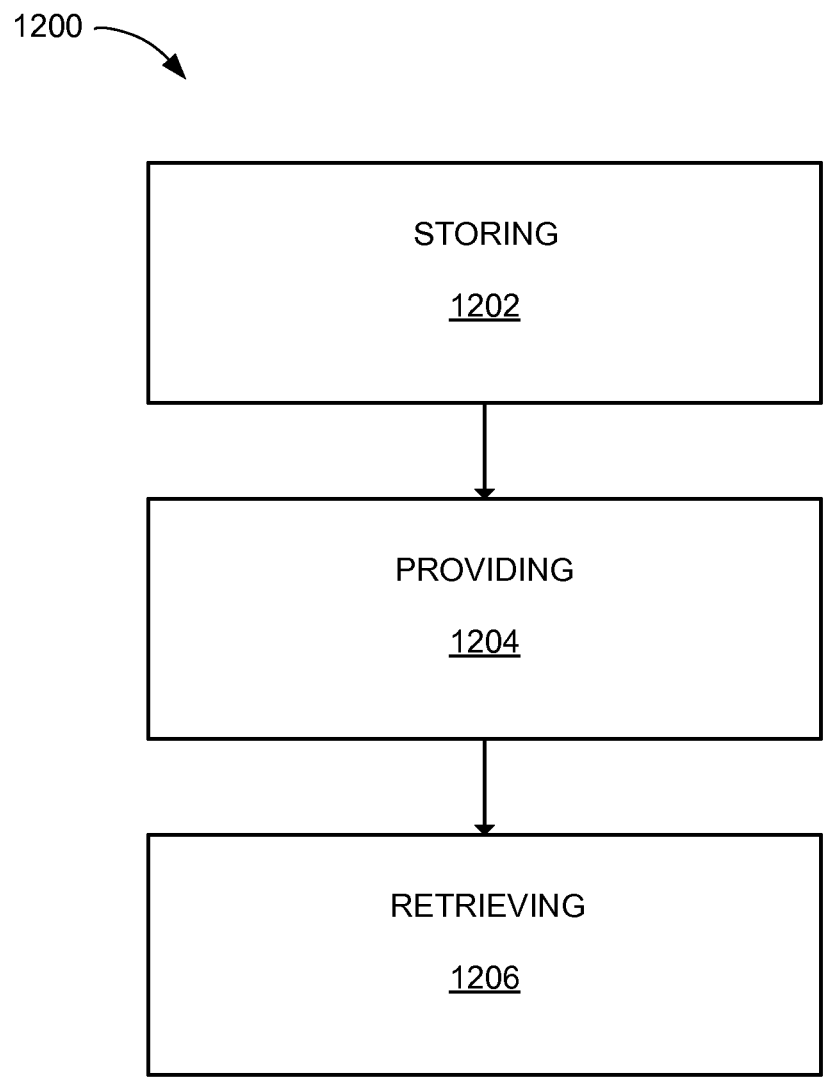
FIG. 12 is a flow chart of a method of operation of an electronic system in an embodiment of the invention.

Referring now to FIG. 12, therein is shown a flow chart of a method 1200 of operation of an electronic system 100 in an embodiment of the present invention. The method 1200 includes: storing a descriptor, including a key and a value, on a storage device with the descriptor having multiple versions linked on the storage device in a block 1202; providing an entry, including a location, with a storage interface, coupled to the storage device in a block 1204; and retrieving the descriptor, including the key and the value, with the storage interface, coupled to the storage device, based on the entry including the location for selecting one of the versions of the descriptor in a block 1206.

The method 1200 for block 1202 can include storing the descriptor on a solid state device, storing the entry on a volatile device, the storage device configured to receive the entry, or combination thereof. The method 1200 for block 1206 can include retrieving a version of the descriptor. The method 1200 can further include storing a stamp on the storage device, storing a pointer on the storage device, or combination thereof. The method 1200 can further include versions with entries. Tracking the entries enables selecting from the versions of entries.

In an embodiment, the electronic system 200 of FIG. 2 including the storage 204 of FIG. 2 with the descriptor 224 of FIG. 2 and the memory 208 of FIG. 2 with the tree 218 of FIG. 2 can require only one input and output (IO) operation for writing a new version on or in a storage medium. The descriptor 224 can include a linked list accessed with the tree 218 for operations by a single input and output (I/O) access.

In an embodiment, the first entry 308 of FIG. 3, the second entry 328 of FIG. 3, the third entry 348 of FIG. 3, the fourth entry 368 of FIG. 3, the fifth entry 388 of FIG. 3, similar additional entries, any entries, or combination thereof, can at least provide a location for saved descriptors in a non-volatile memory device. The first entry 308, the second entry 328, the third entry 348, the fourth entry 368, the fifth entry 388, similar additional entries, any entries, or combination thereof, can at least include a simple number representing a start block address for locating the saved descriptor for each key value pair that was stored in the non-volatile memory device.

In an embodiment, the storage structure 400 of FIG. 4 can provide information about key value pairs including a location of the associated memory structure 400. The storage structure 400 can include the key 414 of FIG. 4, the value 418 of FIG. 4, the metadata 430 of FIG. 4, the key length 434 of FIG. 4, the value length 438 of FIG. 4, or combination thereof.

In an embodiment, the interface 464 of FIG. 4, such as a firmware interface, that can provide writing, updating, inserting, iterating, deleting, or combination thereof, of the storage structure 400. The interface 464 can provide writing, updating, inserting, iterating, deleting, or combination thereof, based on pattern matching of the storage structure 400.

In an embodiment, the storage system 500 of FIG. 5 provides a linked list with all versions of a key value (KV) pair chained on the storage device 504 of FIG. 5. The first pointer 526 of FIG. 5, the second pointer 546 of FIG. 5, the third pointer 566 of FIG. 5, or combination thereof, can point, link, or couple, multiple versions of the descriptors such as the first descriptor 514 of FIG. 5, the second descriptor 534 of FIG. 5, the third descriptor 554 of FIG. 5, or combination thereof.

In an embodiment, the storage structure 600 of FIG. 6 can provide information about key value pairs including a location of the associated memory structure 600. The storage structure 600 can include the key 614 of FIG. 6, the value 618 of FIG. 6, the metadata 630 of FIG. 6, the key length 634 of FIG. 6, the value length 638 of FIG. 6, the pointer 644 of FIG. 6, the stamp 648 of FIG. 6, or combination thereof.

In an embodiment, the interface 664 of FIG. 6, such as a firmware interface, that can provide writing, updating, inserting, iterating, deleting, or combination thereof, of the storage structure 600. The interface 664 can provide writing, updating, inserting, iterating, deleting, or combination thereof, based on pattern matching of the storage structure 600.

All of the modules, processes, functions, applications, or combination thereof, herein can be implemented as hardware, hardware circuitry, or hardware accelerators with the first control unit 112 of FIG. 1 or with the second control unit 134 of FIG. 1. The modules can also be implemented as hardware, hardware circuitry, or hardware accelerators with the first device 102 of FIG. 1 or with the second device 106, and outside of the first control unit 112 or the second control unit 134, respectively.

All or at least a portion of the modules, processes, functions, applications, or combination thereof, herein can be included in the first software 126 of FIG. 1, the second software 142 of FIG. 1, or a combination thereof. All or at least a portion of the modules herein can also be included in the first storage unit 114 of FIG. 1, the second storage unit 246 of FIG. 2, or a combination thereof. The first control unit 112, the second control unit 134, or a combination thereof can execute all of the modules for operating the electronic system 100 of FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance. These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:
1. An electronic system comprising:
a storage device configured to:
store versions of a descriptor, including a pointer, a key, and a value, wherein the pointer includes a location of a preceding version of the descriptor on the storage device;
a memory device, coupled to the storage device configured to:
provide an entry corresponding to one of the versions of the descriptor, wherein the entry includes the location of the descriptor; and
a storage interface, coupled to the memory device, configured to:
retrieve the descriptor, including the key and the value, based on the entry including the location for selecting one of the versions of the descriptor.
2. The system as claimed in claim 1 wherein the storage interface is configured to retrieve a version of the descriptor.
3. The system as claimed in claim 1 wherein the storage device is configured to store a stamp for each of the versions of the descriptor, wherein the stamp uniquely identifies a specific instance of an operation performed on or access to the descriptor.
4. The system as claimed in claim 1 wherein the storage device is configured to store the pointer to form a link list for the versions of the descriptor.
5. The system as claimed in claim 1 wherein the storage device is a solid state device.
6. The system as claimed in claim 1 wherein the storage device is a volatile device.
7. The system as claimed in claim 1 wherein the storage device is configured to track the versions with a snapshot for the versions of the descriptor, wherein the snapshot is accessible for read access during a state change operation to the descriptor.
8. A method of operation of an electronic system comprising:
storing versions of a descriptor, including a pointer, a key, and a value, on a storage device with the descriptor, wherein the pointer includes a location of a preceding version of the descriptor on the storage device;
providing an entry corresponding to one of the versions of the descriptor, wherein the entry includes the location of the descriptor with a memory device, coupled to the storage device; and
retrieving the descriptor, including the key and the value, with the storage interface, coupled to the storage device, based on the entry including the location for selecting one of the versions of the descriptor.

9. The method as claimed in claim 8 wherein retrieving the descriptor includes retrieving a version of the descriptor.

10. The method as claimed in claim 8 further comprising storing a stamp for each of the versions of the descriptor on the storage device, wherein the stamp uniquely identifies a specific instance of an operation performed on or access to the descriptor.

11. The method as claimed in claim 8 further comprising storing, on the storage device, the pointer to form a link list for the versions of the descriptor.

12. The method as claimed in claim 8 wherein storing the descriptor on the storage device includes storing the descriptor on a solid state device.

13. The method as claimed in claim 8 wherein storing the entry includes storing the entry on a volatile device.

14. The method as claimed in claim 8 further comprising tracking the versions with a snapshot for the versions of the descriptor, wherein the snapshot is accessible for read access during a state change operation to the descriptor.

15. A non-transitory computer readable medium including stored thereon instructions to be executed by a control unit comprising:

storing versions of a descriptor, including a pointer, a key, and an value, on a storage device with the descriptor, wherein the pointer includes a location of a preceding version of the descriptor on the storage device;

providing an entry corresponding to one of the versions of the descriptor, wherein the entry includes the location of the descriptor with a memory device, coupled to the storage device; and retrieving the descriptor, including the key and the value, with the storage interface, coupled to the storage device, based on the entry having the location for selecting one of the versions of the descriptor.

16. The medium as claimed in claim 15 wherein retrieving the descriptor includes retrieving a version of the descriptor.

17. The medium as claimed in claim 15 further comprising storing a stamp for each of the versions of the descriptor on the storage device, wherein the stamp uniquely identities a specific instance of an operation performed on or access to the descriptor.

18. The medium as claimed in claim 15 further comprising storing, on the storage device, the pointer to form a link list for the versions of the descriptor.

19. The medium as claimed in claim 15 wherein storing the descriptor on the storage device includes storing the descriptor on a solid state device.

20. The medium as claimed in claim 15 further comprising tracking the versions with a snapshot for the versions of the descriptor, wherein the snapshot is accessible for read access during a state change operation to the descriptor.

* * * * *